US008918611B2

(12) United States Patent
Ito

(10) Patent No.: US 8,918,611 B2
(45) Date of Patent: Dec. 23, 2014

(54) SEMICONDUCTOR DEVICE AND DATA PROCESSING METHOD

(75) Inventor: Yoshitaka Ito, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 925 days.

(21) Appl. No.: 13/046,763

(22) Filed: Mar. 13, 2011

(65) Prior Publication Data
US 2011/0246707 A1 Oct. 6, 2011

(30) Foreign Application Priority Data

Mar. 30, 2010 (JP) .................................. 2010-077532

(51) Int. Cl.
G06F 12/00 (2006.01)
G06F 21/74 (2013.01)
G06F 12/14 (2006.01)
G06F 13/00 (2006.01)

(52) U.S. Cl.
CPC ............ G06F 12/1466 (2013.01); G06F 21/74 (2013.01)
USPC ............ 711/164; 711/100; 711/154; 711/163

(58) Field of Classification Search
CPC ....... G06F 12/14; G06F 3/062; G06F 3/0622; G06F 3/0623; G06F 3/0679; G06F 12/0238
USPC ........................... 711/100, 103, 154, 163, 164
See application file for complete search history.

(56) References Cited

U.S. PATENT DOCUMENTS

| 6,076,149 A | * | 6/2000 | Usami et al. | 711/163 |
| 2004/0078511 A1 | * | 4/2004 | Vogt et al. | 711/103 |
| 2004/0128523 A1 | * | 7/2004 | Fujioka | 713/189 |
| 2004/0236918 A1 | * | 11/2004 | Okaue et al. | 711/164 |
| 2004/0236919 A1 | * | 11/2004 | Okaue et al. | 711/164 |
| 2008/0147967 A1 | * | 6/2008 | Nagao | 711/103 |

FOREIGN PATENT DOCUMENTS

JP 6-35858 A 2/1994
JP 2004-213216 A 7/2004

* cited by examiner

Primary Examiner — Tuan Thai
(74) Attorney, Agent, or Firm — Miles & Stockbridge P.C.

(57) ABSTRACT

A semiconductor device has: as security states to which the nonvolatile memory device can transition, an unprotected state in which, when secret information is not set in the nonvolatile memory device, rewriting the nonvolatile memory device is permitted, and reading the stored information is permitted; a protection unlocked state in which, when the secret information is set in the nonvolatile memory device, rewriting the nonvolatile memory device is permitted on condition that a result of authentication using the secret information is correct, and reading the stored information is permitted; and a protection locked state in which, when the secret information is set in the nonvolatile memory device, rewriting the nonvolatile memory device is inhibited until correctness as a result of authentication using the secret information is confirmed, and reading the stored information is inhibited under a predetermined condition.

24 Claims, 20 Drawing Sheets

FIG. 3

| No. | SECURITY LEVEL | REWRITING NONVOLATILE MEMORY | READING FROM NONVOLATILE MEMORY | DEBUG INTERFACE | KEY CODE | DESCRIPTION |
|---|---|---|---|---|---|---|
| 1 | UNPROTECTED STATE | PERMIT | PERMIT | ENABLE | RESET | INITIAL STATE OR KEY CODE RESET STATE. SOFTWARE IS NOT PROTECTED. |
| 2 | PROTECTION UNLOCKED STATE | PERMIT | PERMIT | ENABLE | SET | KEY CODE IS SET AND AUTHENTICATION IS OBTAINED. PROTECTION OF SOFTWARE IS TEMPORARILY CANCELED. |
| 3 | PROTECTION LOCKED STATE | INHIBIT | INHIBIT UNDER PREDETERMINED CONDITION | ENABLE | SET | KEY CODE IS SET AND AUTHENTICATION IS NOT OBTAINED. SOFTWARE IS PROTECTED. |

FIG. 4

| No. | KEY CODE OPERATION (COMMAND) | COMMAND PARAMETER | FUNCTION |
|---|---|---|---|
| 1 | KEY CODE SET COMMAND | KEY CODE TO BE SET | MEMORY CONTROL SEQUENCER WRITES KEY CODE PROVIDED BY COMMAND TO KEY CODE AREA IN NONVOLATILE MEMORY. KEY CODE SET IS ENABLED ONLY IN UNPROTECTED STATE OR PROTECTION UNLOCKED STATE. |
| 2 | KEY CODE RESET COMMAND | NONE | MEMORY CONTROL SEQUENCER ERASES KEY CODE WRITTEN TO KEY CODE AREA IN NONVOLATILE MEMORY. KEY CODE RESET IS ENABLED ONLY IN UNPROTECTED STATE OR PROTECTION UNLOCKED STATE. |
| 3 | KEY CODE AUTHENTICATION COMMAND | KEY CODE TO BE AUTHENTICATED | MEMORY CONTROL SEQUENCER COMPARES KEY CODE PROVIDED BY COMMAND AND KEY CODE WRITTEN TO KEY CODE AREA IN NONVOLATILE MEMORY. IN THE CASE OF COMPARISON MATCH, SECURITY STATE TRANSITIONS TO PROTECTION UNLOCKED STATE. |

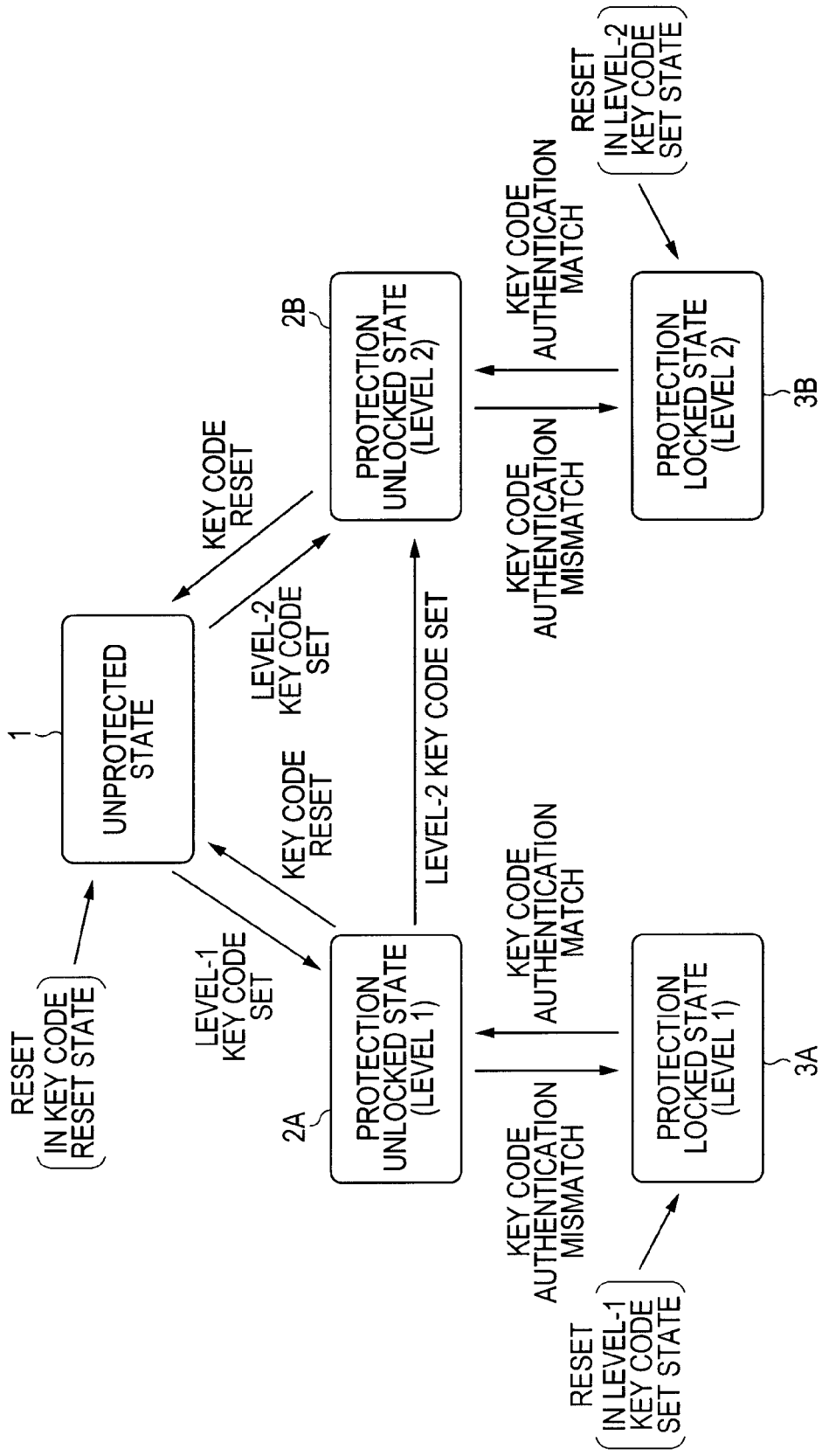

FIG. 20

| No. | SECURITY LEVEL | WRITING TO AND ERASING NONVOLATILE MEMORY | READING FROM NONVOLATILE MEMORY | DEBUG INTERFACE | KEY CODE | DESCRIPTION |
|---|---|---|---|---|---|---|
| 1 | UNPROTECTED STATE | PERMIT | PERMIT | ENABLE | RESET | INITIAL STATE OR KEY CODE RESET STATE. SOFTWARE IS NOT PROTECTED. |
| 2 | PROTECTION UNLOCKED STATE (SECURITY LEVEL 1) | PERMIT | PERMIT | ENABLE | SET | KEY CODE IS SET AND AUTHENTICATION IS OBTAINED. PROTECTION OF SOFTWARE IS TEMPORARILY CANCELED. |
| 3 | PROTECTION LOCKED STATE (SECURITY LEVEL 1) | INHIBIT | INHIBIT UNDER PREDETERMINED CONDITION | ENABLE | SET | KEY CODE IS SET AND AUTHENTICATION IS NOT OBTAINED. SOFTWARE IS PROTECTED. |
| 4 | PROTECTION UNLOCKED STATE (SECURITY LEVEL 2) | PERMIT | PERMIT | ENABLE | SET | KEY CODE IS SET AND AUTHENTICATION IS OBTAINED. PROTECTION OF SOFTWARE IS TEMPORARILY CANCELED. |
| 5 | PROTECTION LOCKED STATE (SECURITY LEVEL 2) | INHIBIT | INHIBIT UNDER PREDETERMINED CONDITION | DISABLE | SET | KEY CODE IS SET AND AUTHENTICATION IS NOT OBTAINED. SOFTWARE IS PROTECTED. |

FIG. 21

| No. | KEY CODE OPERATION (COMMAND) | COMMAND PARAMETER | FUNCTION |
|---|---|---|---|
| 1 | KEY CODE SET COMMAND | KEY CODE TO BE SET | MEMORY CONTROL SEQUENCER WRITES KEY CODE PROVIDED BY COMMAND TO KEY CODE AREA IN NONVOLATILE MEMORY. KEY CODE SET IS ENABLED ONLY IN UNPROTECTED STATE OR PROTECTION UNLOCKED STATE. SECURITY LEVEL CAN BE SELECTED WHEN KEY CODE IS SET. SECURITY LEVEL IS SELECTED BY SPECIFYING ADDRESS ACCORDING TO LEVEL. |
| 2 | KEY CODE RESET COMMAND | NONE | MEMORY CONTROL SEQUENCER ERASES KEY CODE WRITTEN TO KEY CODE AREA IN NONVOLATILE MEMORY. KEY CODE RESET IS ENABLED ONLY IN UNPROTECTED STATE OR PROTECTION UNLOCKED STATE. |
| 3 | KEY CODE AUTHENTICATION COMMAND | KEY CODE TO BE AUTHENTICATED | MEMORY CONTROL SEQUENCER COMPARES KEY CODE PROVIDED BY COMMAND AND KEY CODE WRITTEN TO KEY CODE AREA IN NONVOLATILE MEMORY. IN THE CASE OF COMPARISON MATCH, SECURITY STATE TRANSITIONS TO PROTECTION UNLOCKED STATE. |

SEMICONDUCTOR DEVICE AND DATA PROCESSING METHOD

CROSS-REFERENCE TO RELATED APPLICATIONS

The disclosure of Japanese Patent Application No. 2010-77532 filed on Mar. 30, 2010 including the specification, drawings and abstract is incorporated herein by reference in its entirety.

BACKGROUND OF THE INVENTION

The present invention relates to a security control technique for an electrically erasable programmable nonvolatile memory device in a semiconductor device including the nonvolatile memory device and a data processing technique of rewriting by externally changing the security state of the nonvolatile memory device in a data processing system incorporating the semiconductor device, and to a technique effective when applied to e.g. a microcomputer and its application system.

Japanese Unexamined Patent Publication No. 2004-213216 describes an information security microcomputer, which includes a cryptographic circuit for encoding and decoding information, an authentication program for authenticating an in-circuit emulator (ICE) proper, and a CPU for performing overall control of the information security microcomputer. If the authentication of the ICE proper is not confirmed, the CPU stops at least some functions of the information security microcomputer. Accordingly, an unauthorized person cannot use the information security microcomputer as an ICE microcomputer, which can improve the security.

Japanese Unexamined Patent Publication No. Hei 6 (1994)-35858 describes a control technique in which a password storage area and a security state memory area for storing either a locked state or an unlocked state are provided in an EEPROM of a terminal device, the security state transitions to the unlocked state upon storage of a password, the security state transitions to the locked state and a password input screen is displayed if the password is stored and a security lock is instructed, and a regular business screen is displayed in the unlocked state. In the state in which the password input screen is displayed, an input signal is checked against the stored password. If the input signal matches the password, the security state transitions to the unlocked state. The security state remains the locked state until a match is made.

SUMMARY OF THE INVENTION

According to the technique described in Japanese Unexamined Patent Publication No. 2004-213216, software is protected, for example, in analysis using a debug tool such as the in-circuit emulator, but there is no protection function in an operation state of executing an ordinary user application, which cannot inhibit a third person from illegally reading or rewriting the contents of a nonvolatile memory device included in the microcomputer. As a matter of course, in the protection state of software in the on-chip nonvolatile memory device in a debug mode, it is not possible to update a program or data in the on-chip nonvolatile memory device in the operation state of a real machine executing the user application.

According to the technique described in Japanese Unexamined Patent Publication No. Hei 6 (1994)-35858, the invention is directed to the security of the terminal device such as a workstation. Since, in the terminal device, a processor (CPU) checks the password stored in the EEPROM using a program stored in a ROM, a third person can very easily analyze the program stored in the ROM or the operation of the CPU to know the password stored in the EEPROM; therefore, its security can be considered to be substantially low.

It is an object of the present invention to provide a semiconductor device that can set and cancel protection for an on-chip nonvolatile memory device under predetermined authority, both during system debug and in the case of incorporation in a real machine.

It is another object of the invention to provide a data processing method for enabling the rewriting of an on-chip nonvolatile memory device to which protection is set, under predetermined authority, both during system debug and in the case of incorporation in a real machine.

The above and other objects and novel features of the present invention will become apparent from the description of this specification and the accompanying drawings.

A typical aspect of the invention disclosed in the present application will be briefly described as follows.

A semiconductor device has, as a security state to which a nonvolatile memory device mounted on the semiconductor device can transition, at least a first security state (unprotected state) in which, when secret information is not set in the nonvolatile memory device, rewriting the nonvolatile memory device is permitted, and external output of information stored in the nonvolatile memory device through an external interface circuit is permitted.

Further, the semiconductor device has a second security state (protection unlocked state) in which, when the secret information is set in the nonvolatile memory device, rewriting the nonvolatile memory device is permitted on condition that a result of authentication using the secret information is correct, and external output of the information stored in the nonvolatile memory device through the external interface circuit is permitted.

Further, the semiconductor device has a third security state (protection locked state) in which, when the secret information is set in the nonvolatile memory device, rewriting the nonvolatile memory device is inhibited until correctness as a result of authentication using the secret information is confirmed, reading from the nonvolatile memory device is inhibited under a predetermined condition, and external output through the external interface circuit is permitted.

The setting and cancellation of the security states are determined based on the authority pertinent to the secret information, so that it is possible to set and cancel the security states regardless of operation during system debug or in the case of incorporation in a real machine.

The secret information is stored in the nonvolatile memory device under protection, and in the stored state, the security state is at least the second security state. Further, secret information rewriting or external readout requires an authentication match; therefore, the secret information does not easily leak out. In this respect, the protection for the nonvolatile memory device is highly reliable.

A typical effect of the invention disclosed in the present application will be briefly described as follows.

It is possible to set and cancel protection for an on-chip nonvolatile memory device under predetermined authority, both during system debug and in the case of incorporation in a real machine.

BRIEF DESCRIPTION OF THE DRAWINGS

FIG. 3 is an explanatory diagram illustrating the security states (security levels) of the nonvolatile memory device;

FIG. 4 is an explanatory diagram of operation commands pertinent to the security states in FIG. 3;

FIG. 19 is a state transition diagram of the security levels according to the third embodiment;

FIG. 20 is an explanatory diagram showing the security states (security levels) of the nonvolatile memory device; and FIG. 21 is an explanatory diagram showing operation commands pertinent to the security states in FIG. 20.

DESCRIPTION OF THE PREFERRED EMBODIMENTS

1. Outline of Embodiments

Figure 1:
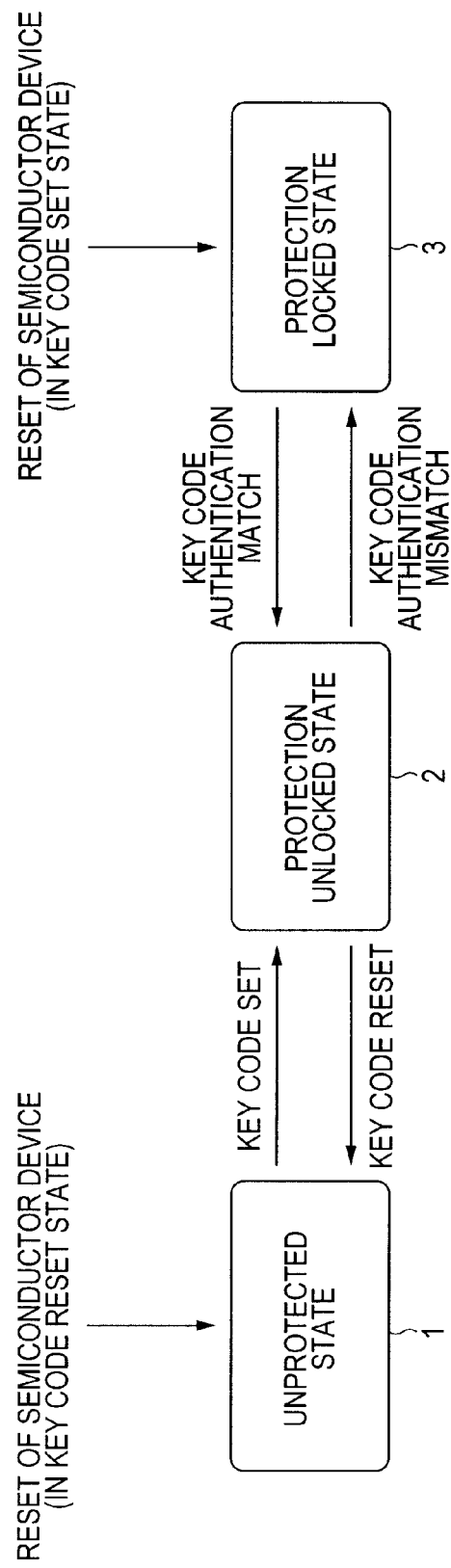
FIG. 1 is a state transition diagram of the security levels of an on-chip nonvolatile memory device according to a first embodiment of the present invention.

First, the outline of typical embodiments of the invention disclosed in the present application will be described. Reference numerals in the drawings that refer to with parentheses applied thereto in the outline description of the typical embodiments are merely illustration of ones contained in the concepts of components marked with the reference numerals.

[1] <Three Transitionable Security States>

A semiconductor device (10) according to a typical embodiment of the invention includes an electrically erasable programmable nonvolatile memory device (14), a central processing unit (11) for executing an instruction, an external interface circuit (16, 17), and an external bus circuit (19), and the nonvolatile memory device, the central processing unit, the external interface circuit, and the external bus circuit are coupled to an internal bus (18). The semiconductor device has first to third security states as security states to which the nonvolatile memory device can transition.

In the first security state (unprotected state 1), when secret information is not set in the nonvolatile memory device, reading from the nonvolatile memory device is permitted, rewriting the nonvolatile memory device is permitted, and external output from the external interface circuit is permitted. In the second security state (protection unlocked state 2), when the secret information is set in the nonvolatile memory device, reading from the nonvolatile memory device is permitted, rewriting the nonvolatile memory device is permitted on condition that a result of authentication using the secret information is correct, and external output from the external interface circuit is permitted. In the third security state (protection locked state 3), when the secret information is set in the nonvolatile memory device, rewriting the nonvolatile memory device is inhibited until correctness as a result of authentication using the secret information is confirmed, reading from the nonvolatile memory device is inhibited under a predetermined condition, and external output from the external interface circuit is permitted.

According to this, the setting and cancellation of the security states are determined based on the authority pertinent to the secret information, so that it is possible to set and cancel the security states regardless of operation during system debug or in the case of incorporation in a real machine. Further, the secret information is stored in the nonvolatile memory device under protection, and in the stored state, the security state is at least the second security state. Further, secret information rewriting or external readout requires an authentication match; therefore, the secret information does not easily leak out. In this respect, the protection for the nonvolatile memory device is highly reliable.

[2] <Security Control by Memory Control Unit>

In the semiconductor device according to item 1, the nonvolatile memory device has a nonvolatile memory unit (13) having an array of nonvolatile memory cells and a memory control unit (12) for controlling erase, write, and read operation procedures for a memory cell of the nonvolatile memory unit, and the memory control unit further controls the first to third security states.

Since the memory control unit controls the security states, that is, a security state control method is concealed by the logical configuration of the memory control unit, third person cannot easily know the security state control method, thereby enhancing the security.

[3] <Security State Maintenance by Reset>

In the semiconductor device according to item 1 or 2, in a reset operation of the semiconductor device instructed in the second security state or the third security state, the memory control unit causes an initial security state of the nonvolatile memory device to be the third security state.

A forced reset of the semiconductor device does not cancel the protection for the nonvolatile memory device. When the semiconductor device is reset in the first security state, the security state remains the first security state. Therefore, in system debugging having frequent reset operations, there is no inconvenience of protecting, by each reset, the nonvolatile memory device and disabling writing.

[4] <Security Control Commands>

In the semiconductor device according to item 2, the memory control unit has a set command, a reset command, and an authentication command, as a command set for controlling the first to third security states. The set command is a command for writing the secret information inputted from the external interface circuit to a predetermined memory area in the nonvolatile memory unit. The reset command is a command for disabling information in the predetermined memory area. The authentication command is a command for controlling transition of the security state by comparing the secret information stored in the predetermined memory area with information provided from the external interface circuit and determining authentication correctness by a comparison match and authentication incorrectness by a comparison mismatch.

Operations that respond to the commands for security control are concealed by the logical configuration of the memory control unit.

[5] <Security State Transition Control>

In the semiconductor device according to item 4, the memory control unit causes the security state to transition to the first security state (unprotected state) by execution of the reset command in the second security state (protection unlocked state) or by a reset operation of the semiconductor device in a state in which the information in the predetermined memory area is disabled.

Further, the memory control unit causes the security state to transition to the second security state by execution of the set command in the first security state (unprotected state) or by authentication correctness as an authentication result of executing the authentication command in the third security state (protection locked state).

Further, the memory control unit causes the security state to transition to the third security state (protection locked state) by authentication incorrectness as an authentication result of executing the authentication command in the second security state (protection unlocked state) or by a reset operation of the semiconductor device in a state in which the secret information is set in the predetermined memory area.

According to the above transition control, a forced reset of the semiconductor device does not cancel the protection for the nonvolatile memory device. When the semiconductor device is reset in the first security state, the security state remains the first security state. Therefore, in system debugging having frequent reset operations, there is no inconvenience of protecting, by each reset, the nonvolatile memory device and disabling writing.

[6] <Control Mode Register>

The semiconductor device according to item 4 further includes a control mode register (MREG) having a security control mode bit (SCM). Setting the security control mode bit to a first value enables execution of the set command, the reset command, and the authentication command. Setting the security control mode bit to a second value disables change of the security state by execution of the set command, the reset command, and the authentication command.

The security state transition control using the secret information can advantageously be switched to unselection as necessary. Even if the security state transition control is switched from selection to unselection by operating the security control mode bit, the third security state or the second security state of this time is inhibited from transitioning to the first security state.

[7] <Security Control Status Register>

The semiconductor device according to item 6 further includes a security control status register (SREG) indicating the current security state in the security control mode.

It is possible to easily confirm the security state in accordance with the need of an internal operation by the memory control unit, etc.

[8] <Nonvolatile Memory Device Read Inhibit>

In the semiconductor device according to any one of items 1 to 7, read inhibit under the predetermined condition refers to that after detection of an instruction fetch in external address space via the external bus circuit by the central processing unit. The nonvolatile memory device read inhibit in the third security state is performed by outputting, from the nonvolatile memory device which responds to a read request, a predetermined value independent of reading from the memory or a random value different from output data of the nonvolatile memory device.

In a regular state of executing a program stored in the nonvolatile memory device in a rewrite inhibit state, a fraud is assumed to start by causing the central processing unit to fetch a malicious program from external address space. Accordingly, in the regular program execution state prior thereto, data readout from the nonvolatile memory device to the outside is permitted, and after an occurrence of an instruction fetch cycle assumed to be a fraud from the external space, information stored in the nonvolatile memory device is not outputted to the outside at all, thus placing the highest priority on the protection of the stored information.

Further, under the predetermined condition in the third security state, regular data stored in the nonvolatile memory device does not exist outside the nonvolatile memory device in any sense, and even though the regular data is inhibited from being outputted outside the semiconductor device, it is also possible to inhibit retention over the internal bus or buffer. In this respect as well, it is possible to achieve complete security.

[9] <External Output Inhibit of Secret Information>

In the semiconductor device according to any one of items 1 to 7, the memory control unit disables a request for read access to an area for storing the secret information provided via the internal bus.

It is possible to completely prevent the leakage of the secret information even in the first security state.

[10] <Five Transitionable Security States>

A semiconductor device (400) according to another embodiment of the invention includes an electrically erasable programmable nonvolatile memory device (414), a central processing unit (411) for executing an instruction, a first external interface circuit (417) which is assigned as a debug-specific external interface, a second external interface circuit (416) which is assigned as the other external interface, and an external bus circuit (419), and the nonvolatile memory device, the central processing unit, the first external interface circuit, the second external interface circuit, and the external bus circuit are coupled to an internal bus (418).

Further, the semiconductor device has first to fifth security states as security states to which the nonvolatile memory device can transition.

In the first security state (unprotected state 1), when first secret information and second secret information are not set in the nonvolatile memory device, reading from the nonvolatile memory device is permitted, rewriting the nonvolatile memory device is permitted, and external output from the first external interface circuit and the second external interface circuit is permitted. In the second security state (first protection unlocked state 2A), when the first secret information is set in the nonvolatile memory device, reading from the nonvolatile memory device is permitted, rewriting the nonvolatile memory device is permitted on condition that a result of authentication using the secret information is correct, and external output from the first external interface circuit and the second external interface circuit is permitted.

Further, in the third security state (first protection locked state 3A), when the first secret information is set in the nonvolatile memory device, rewriting the nonvolatile memory device is inhibited until correctness as a result of authentication using the secret information is confirmed, reading from the nonvolatile memory device is inhibited under a predetermined condition, and external output from the first external interface circuit and the second external interface circuit is permitted. In the fourth security state (second protection unlocked state 2B), when the second secret information is set in the nonvolatile memory device, reading from the nonvolatile memory device is permitted, rewriting the nonvolatile memory device is permitted on condition that a result of authentication using the secret information is correct, and external output from the first external interface circuit and the second external interface circuit is permitted. In the fifth security state (second protection locked state 3B), when the second secret information is set in the nonvolatile memory device, rewriting the nonvolatile memory device is inhibited until correctness as a result of authentication using the secret information is confirmed, reading from the nonvolatile memory device is inhibited under the predetermined condition, and an interface operation of the first external interface circuit is disabled, and external output from the second external interface circuit is permitted.

The semiconductor device according to item 10 differs from the semiconductor device according to item 1 in that it has the fourth and fifth security states. The secret information used for transition to the fourth and fifth security states differs from the secret information used for transition to the second and third security states, and the fifth security state differs from the third security state in that the first external interface circuit is disabled. Therefore, by operating, with only transitions to the first, fourth, and fifth security states, such a processing entity as merely rewrites the nonvolatile memory device, it is possible to prevent the nonvolatile memory device from being easily attacked by unauthorized access in the semiconductor device through the use of the debug-specific first external interface circuit having the interface specification disclosed. On the other hand, by enabling transitions to the first, second, and third security states for such a processing entity as performs processing including the rewriting of the nonvolatile memory device as part of the system debug, it is possible to provide an easy-to-use debug environment.

[11] <Security Control by Memory Control Unit>

In the semiconductor device according to item 10, the nonvolatile memory device has a nonvolatile memory unit having an array of nonvolatile memory cells and a memory control unit for controlling erase, write, and read operation procedures for a memory cell of the nonvolatile memory unit. The memory control unit further controls the first to fifth security states.

Since the memory control unit controls the security states, a security state control method is concealed by the logical configuration of the memory control unit, so that a third person cannot easily know the security state control method, thereby enhancing the security.

[12] <Security State Maintenance by Reset>

In the semiconductor device according to item 11, in a reset operation of the semiconductor device instructed in the second security state or the third security state, the memory control unit causes an initial security state of the nonvolatile memory device to be the third security state, and in a reset operation of the semiconductor device instructed in the fourth security state or the fifth security state, the memory control unit causes an initial security state of the nonvolatile memory device to be the fifth security state.

A forced reset of the semiconductor device does not cancel the protection for the nonvolatile memory device. When the semiconductor device is reset in the first security state, the security state remains the first security state. Therefore, in system debugging having frequent reset operations, there is no inconvenience of protecting, by each reset, the nonvolatile memory device and disabling writing.

[13] <Individualized Storage of First and Second Secret Information>

In the semiconductor device according to item 11, the nonvolatile memory unit has a first memory area assigned to store the first secret information and a second memory area assigned to store the second secret information individually.

[14] <Security Control Commands>

In the semiconductor device according to item 13, the memory control unit has a set command, a reset command, and an authentication command, as a command set for controlling the first to fifth security states. The set command is a command for writing information inputted from the first external interface circuit or the second external interface circuit to the first memory area or the second memory area by specifying the first memory area or the second memory area. The reset command is a command for disabling the information in the first memory area and the second memory area. The authentication command is a command for controlling transition of the security state by comparing the information inputted by specifying the first memory area or the second memory area with information in the specified first or second memory area and determining authentication correctness of the secret information in the specified memory area by a comparison match as to the information in the specified memory area and authentication incorrectness by a comparison mismatch as to the information in the specified memory area.

Operations that respond to the commands for security control are concealed by the logical configuration of the memory control unit.

[15] <Security State Transition Control>

In the semiconductor device according to item 14, the memory control unit causes the security state to transition to the first security state (unprotected state) by execution of the reset command in the second security state (first protection unlocked state), by execution of the reset command in the fourth security state (second protection unlocked state), or by a reset operation of the semiconductor device in a state in which the information in the first memory area and the second memory area is disabled. The memory control unit causes the security state to transition to the second security state by execution of the set command specifying the first memory area in the first security state (unprotected state) or by authentication correctness as an authentication result of executing the authentication command specifying the first memory area in the third security state (first protection locked state). The memory control unit causes the security state to transition to the third security state (first protection locked state) by authentication incorrectness as an authentication result of executing the authentication command specifying the first memory area in the second security state (first protection unlocked state) or by a reset operation of the semiconductor device in a state in which the secret information is set in the first memory. The memory control unit causes the security state to transition to the fourth security state (second protection unlocked state) by execution of the set command specifying the second memory area in the first security state (unprotected state), by authentication correctness as an authentication result of executing the authentication command specifying the second memory area in the fifth security state (second protection locked state), or by execution of the set command specifying the second memory area in the second security state (first protection unlocked state). The memory control unit causes the security state to transition to the fifth security state (second protection locked state) by authentication incorrectness as an authentication result of executing the authentication command specifying the second memory area in the fourth security state (second protection unlocked state) or by a reset operation of the semiconductor device in a state in which the secret information is set in the second memory.

According to the above transition control, a forced reset of the semiconductor device does not cancel the protection for the nonvolatile memory device. When the semiconductor device is reset in the first security state, the security state remains the first security state. Therefore, in system debugging having frequent reset operations, there is no inconvenience of protecting, by each reset, the nonvolatile memory device and disabling writing.

[16] <Control Mode Register>

The semiconductor device according to item 14 or 15 includes a control mode register having a security control mode bit. Setting the security control mode bit to a first value enables execution of the set command, the reset command, and the authentication command. Setting the security control mode bit to a second value disables change of the security state by execution of the set command, the reset command, and the authentication command.

The security state transition control using the secret information can advantageously be switched to unselection as necessary. Even if the security state transition control is switched from selection to unselection by operating the security control mode bit, the third security state, the second security state, the fifth security state, or the fourth security state of this time is inhibited from transitioning to the first security state.

[17] <Security Control Status Register>

The semiconductor device according to item 16 further includes a security control status register indicating the current security state in the security control mode.

It is possible to easily confirm the security state in accordance with the need of an internal operation by the memory control unit, etc.

[18] <Nonvolatile Memory Device Read Inhibit>

In the semiconductor device according to any one of items 10 to 17, read inhibit under the predetermined condition refers to that after detection of an instruction fetch in external address space via the external bus circuit by the central processing unit. The nonvolatile memory device read inhibit in the third security state and the fifth security state is performed by outputting, from the nonvolatile memory device which responds to a read request, a predetermined value independent of reading from the memory or a random value different from output data of the nonvolatile memory device.

In a regular state of executing a program stored in the nonvolatile memory device in a rewrite inhibit state, a fraud is assumed to start by causing the central processing unit to fetch a malicious program from external address space. Accordingly, in the regular program execution state prior thereto, data readout from the nonvolatile memory device to the outside is permitted, and after an occurrence of an instruction fetch cycle assumed to be a fraud from the external space, information stored in the nonvolatile memory device is not outputted to the outside at all, thus placing the highest priority on the protection of the stored information.

Further, under the predetermined condition in the third security state and the fifth security state, regular data stored in the nonvolatile memory device does not exist outside the nonvolatile memory device in any sense, and even though the regular data is inhibited from being outputted outside the semiconductor device, it is also possible to inhibit retention over the internal bus or buffer. In this respect as well, it is possible to achieve complete security.

[19] <External Output Inhibit of Secret Information>

In the semiconductor device according to any one of items 10 to 18, the memory control unit disables a request for read access to an area for storing the secret information provided via the internal bus.

It is possible to completely prevent the leakage of the secret information even in the first security state.

[20] <Rewrite Method for LSI Having Three Transitionable Security States>

A data processing method for rewriting the nonvolatile memory device by coupling an external device to the external interface circuit in a data processing system using the semiconductor device according to item 1 includes a first step of determining by the semiconductor device whether information supplied from the external device to the semiconductor device matches the secret information stored in the nonvolatile memory device.

Further, the data processing method includes a second step of causing, by the semiconductor device, the security state of the nonvolatile memory device to transition to the second security state if a determination result by the first step in the third security state is a match, and a third step of rewriting, by the external device, the nonvolatile memory device of the semiconductor device in the second security state brought by the second step.

Further, the data processing method includes a fourth step of supplying, by the external device, information different from the secret information to the semiconductor device after the third step, and a fifth step of causing, by the semiconductor device, the security state of the nonvolatile memory device to transition to the third security state after confirming that the information supplied in the fourth step does not match the secret information.

It is possible to efficiently and safely deal with processing that merely rewrites information stored in the nonvolatile memory device.

[21] <Debug Method for LSI Having Three Transitionable Security States>

A data processing method for rewriting the nonvolatile memory device by coupling an external device to the external interface circuit in a data processing system using the semiconductor device according to item 1 includes a first step of determining by the semiconductor device whether information supplied from the external device to the semiconductor device matches the secret information stored in the nonvolatile memory device.

Further, the data processing method includes a second step of causing, by the semiconductor device, the security state of the nonvolatile memory device to transition to the second security state if a determination result by the first step in the third security state is a match, and a third step of disabling, by the external device, the secret information stored in the nonvolatile memory device of the semiconductor device in the second security state brought by the second step to cause the security state to transition to the first security state.

Further, the data processing method includes a fourth step of analyzing, by the external device, an operation while rewriting the semiconductor device, in the first security state of the nonvolatile memory device brought by the third step, and a fifth step of setting, by the external device, secret information after the fourth step.

Further, the data processing method includes a sixth step of supplying, by the external device, information different from the secret information set in the fifth step to the semiconductor device, and a seventh step of causing, by the semiconductor device, the security state of the nonvolatile memory device to transition to the third security state after confirming that the information supplied in the sixth step does not match the secret information set in the fifth step.

It is possible to efficiently deal with debug processing for analyzing system performance, etc. by restarting the data processing system while rewriting information stored in the nonvolatile memory device.

[22] <Rewrite Method for LSI Having Five Transitionable Security States>

A data processing method for rewriting the nonvolatile memory device by coupling an external device to the first external interface circuit or the second external interface circuit in a data processing system using the semiconductor device according to item 10 includes a first step of determining by the semiconductor device whether information supplied from the external device to the semiconductor device matches the secret information stored in the nonvolatile memory device.

Further, the data processing method includes a second step of causing, by the semiconductor device, the security state of the nonvolatile memory device to transition to the second security state if a determination result by the first step in the third security state is a match, and a third step of rewriting, by the external device, the nonvolatile memory device of the semiconductor device in the second security state brought by the second step.

Further, the data processing method includes a fourth step of supplying, by the external device, information different from the secret information to the semiconductor device after the third step, and a fifth step of causing, by the semiconductor device, the security state of the nonvolatile memory device to transition to the third security state after confirming that the information supplied in the fourth step does not match the secret information.

It is possible to efficiently and safely deal with processing that merely rewrites information stored in the nonvolatile memory device. In this case, the external device may be coupled to either the first external interface circuit or the second external interface circuit.

[23] <Debug Method for LSI Having Five Transitionable Security States>

A data processing method for rewriting the nonvolatile memory device by coupling an external device to the first external interface circuit or the second external interface circuit in a data processing system using the semiconductor device according to item 10 includes a first step of determining by the semiconductor device whether information supplied from the external device to the semiconductor device matches the secret information stored in the nonvolatile memory device.

Further, the data processing method includes a second step of causing, by the semiconductor device, the security state of the nonvolatile memory device to transition to the second security state if a determination result by the first step in the third security state is a match, and a third step of disabling, by the external device, the secret information stored in the nonvolatile memory device of the semiconductor device in the second security state brought by the second step to cause the security state to transition to the first security state.

Further, the data processing method includes a fourth step of analyzing, by the external device, an operation while rewriting the semiconductor device, in the first security state of the nonvolatile memory device brought by the third step, and a fifth step of setting, by the external device, secret information after the fourth step.

Further, the data processing method includes a sixth step of supplying, by the external device, information different from the secret information set in the fifth step to the semiconductor device, and a seventh step of causing, by the semiconductor device, the security state of the nonvolatile memory device to transition to the third security state after confirming that the information supplied in the sixth step does not match the secret information set in the fifth step.

It is possible to efficiently deal with debug processing for analyzing system performance, etc. by restarting the data processing system while rewriting information stored in the nonvolatile memory device.

[24] <Rewrite Method for LSI Having Five Transitionable Security States>

A data processing method for rewriting the nonvolatile memory device by coupling an external device to the second external interface circuit in a data processing system using the semiconductor device according to item 10 includes a first step of determining by the semiconductor device whether information supplied from the external device to the semiconductor device matches the secret information stored in the nonvolatile memory device.

Further, the data processing method includes a second step of causing, by the semiconductor device, the security state of the nonvolatile memory device to transition to the fourth security state if a determination result by the first step in the fifth security state is a match, a third step of rewriting, by the external device, the nonvolatile memory device of the semiconductor device in the fourth security state brought by the second step.

Further, the data processing method includes a fourth step of supplying, by the external device, information different from the secret information to the semiconductor device after the third step, and a fifth step of causing, by the semiconductor device, the security state of the nonvolatile memory device to transition to the fifth security state after confirming that the information supplied in the fourth step does not match the secret information.

By operating, with only transitions to the fourth and fifth security states, such a processing entity as merely rewrites the nonvolatile memory device, it is possible to prevent the nonvolatile memory device from being attacked by unauthorized access in the semiconductor device through the use of the debug-specific first external interface circuit having the interface specification disclosed.

2. Details of Embodiments

Embodiments will be described in greater detail below.

First Embodiment

<<Microcomputer>>

Figure 2:
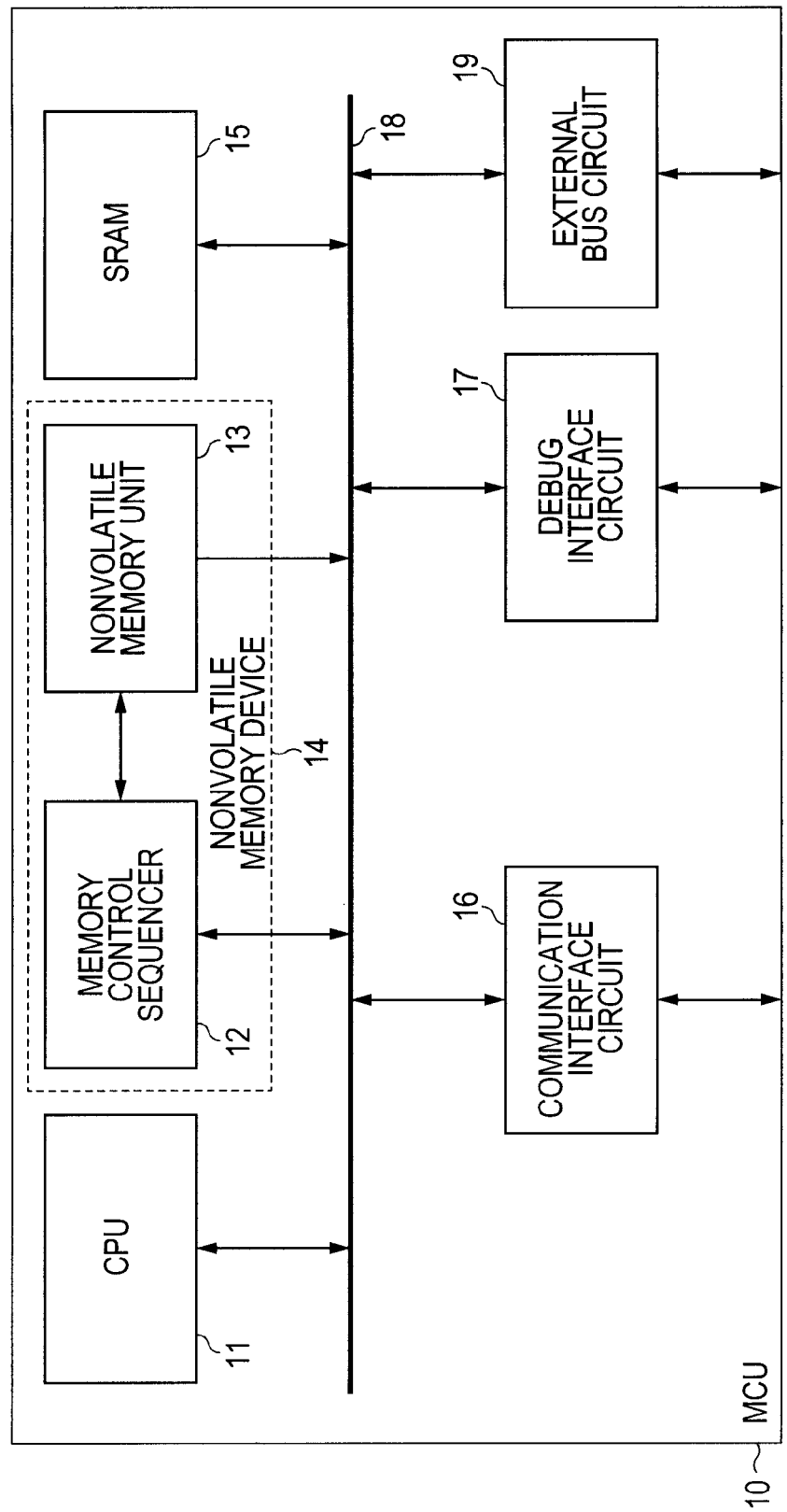
FIG. 2 is a block diagram illustrating the configuration of a microcomputer according to the first embodiment of the invention.

FIG. 2 illustrates the configuration of a microcomputer as an example of a semiconductor device according to the invention. The microcomputer (MCU) 10, though not particularly limited, is formed over a single semiconductor substrate such as monocrystal silicon, using a complementary MOS integrated circuit manufacturing technology or the like.

The microcomputer 10 includes an electrically erasable programmable nonvolatile memory device 14, a central processing unit (CPU) 11 for executing instructions, a Static Random Access Memory (SRAM) 15 for use as a work area or the like for the central processing unit 11, a first external interface circuit (debug interface circuit) 17 which is assigned as a debug-specific external interface, a second external interface circuit (communication interface circuit) 16 which is assigned as the other external interface, and an external bus circuit 19, and these units are coupled to an internal bus 18. The internal bus 18 may be hierarchized.

The nonvolatile memory device 14 includes a nonvolatile memory unit 13 having an array of nonvolatile memory cells and a memory control unit (memory control sequencer) 12 for controlling erase, write, and read operation procedures for memory cells of the nonvolatile memory unit 13. The memory control sequencer 12 receives access commands, addresses, write data, and the like from the CPU 11, and controls erase, write, and read operations on the nonvolatile memory unit 13. Read data is outputted from the nonvolatile memory unit 13 to the internal bus 18. The nonvolatile memory device 14 is, for example, a flash memory, an Electrically Erasable and Programmable Read Only Memory (EEPROM), or a Magnetoresistive Random Access Memory (MRAM).

Although not particularly limited, a communication standard or a communication protocol such as Universal Asynchronous Receiver Transmitter (UART), Local Interconnect Network (LIN), Controller Area Network (CAN), FlexRay, Universal Serial Bus (USB), or IEEE1394 can be adopted in the communication interface circuit 16.

For example, JTAG (IEEE754), Non Break Debug (NBD) or the like can be adopted in the debug interface circuit 17.

The external bus circuit 19 is coupled to, for example, a memory bus circuit over a board for debug or in an automotive electronic control system. The memory bus over the board is coupled to, for example, a Static Random Access Memory (SRAM), a flash memory, an Electrically Erasable and Programmable Read Only Memory (EEPROM), a Magnetoresistive Random Access Memory (MRAM) or the like, where instructions and data from the central processing unit are stored.

The memory control sequencer 12 performs memory access control and security control to inhibit unauthorized erasing, writing to, and reading from the nonvolatile memory unit 13.

<<Three-state Security Levels>>

FIG. 3 illustrates the security states (security levels) of the nonvolatile memory device. The illustrated security levels are comprised of three states which are an unprotected state (first security state), a protection unlocked state (second security state), and a protection locked state (third security state).

In the unprotected state, when a key code (secret information) is not set in the nonvolatile memory device 14, reading from the nonvolatile memory device 14 is permitted, rewriting the nonvolatile memory device 14 is permitted, and external output from the external interface circuits 16 and 17 is permitted. That is, software, etc. stored in the nonvolatile memory device 14 are not protected.

In the protection unlocked state, when the key code is set in the nonvolatile memory device 14, reading from the nonvolatile memory device 14 is permitted, rewriting the nonvolatile memory device 14 is permitted on the condition that a result of authentication using the key code is correct, for example, an externally supplied key code matches the set key code, and external output from the external interface circuits 16 and 17 is permitted. In this state, the protection of software, etc. stored in the nonvolatile memory device 14 is temporarily canceled in the case where an authentication result is correct.

In the protection locked state, when the key code is set in the nonvolatile memory device 14, rewriting the nonvolatile memory device 14 is inhibited until correctness as a result of authentication using the key code is confirmed, reading from the nonvolatile memory device 14 is inhibited under a predetermined condition, and external output from the external interface circuits 16 and 17 is permitted. That is, software, etc. stored in the nonvolatile memory device 14 are protected.

The read inhibit under the predetermined condition refers to that after detection of an instruction fetch in external address space via the external bus circuit 19 by the central processing unit 11. In the protection locked state, by outputting, from the nonvolatile memory device 14, a predetermined value independent of reading from the memory or a random value different from the output data of the nonvolatile memory device, it is possible to protect the software stored in the nonvolatile memory device 14. In a regular state of executing a program stored in the nonvolatile memory device 14 in a rewrite inhibit state, a fraud is assumed to start by causing the CPU 11 to fetch a malicious program from the external address space. Accordingly, in the regular program execution state prior thereto, data readout from the nonvolatile memory device 14 to the outside is permitted, and after an occurrence of an instruction fetch cycle assumed to be a fraud from the external space, information stored in the nonvolatile memory device 14 is not outputted to the outside at all, thus placing the highest priority on the protection of the stored information.

Further, under the predetermined condition in the protection locked state, regular data stored in the nonvolatile memory device 14 does not exist outside the nonvolatile memory device 14 in any sense, and even though the regular data is inhibited from being outputted outside the microcomputer 10, it is also possible to inhibit retention over the internal bus or buffer.

FIG. 4 illustrates operation commands pertinent to the security states. The memory control sequencer 12 has a key code set command, a key code reset command, and a key code authentication command, as a set of operation commands for controlling the security states.

The key code set command is a command for an operation (key code set) for writing the key code inputted from the external interface circuits 16 and 17 to a predetermined memory area (key code memory area) in the nonvolatile memory unit 13. The key code set is enabled in the unprotected state or the protection unlocked state. The key code to be set is specified by a command parameter. Although not particularly limited, the memory control sequencer 12 disables a request for read access to the key code area provided via the bus 18. By disabling an unauthorized read request as well as unauthorized rewriting, the key code is completely protected.

The key code reset command is a command for disabling, e.g., erasing information in the key code memory area. The key code reset is enabled in the unprotected state or the protection unlocked state.

The key code authentication command is a command for controlling transition of the security state by comparing the key code stored in the key code memory area with information provided from the external interface circuits 16 and 17 and determining authentication correctness by a comparison match and authentication incorrectness by a comparison mismatch. In the case of authentication correctness in the protection locked state, the security state transitions to the protection unlocked state. In the case of authentication incorrectness in the protection unlocked state, the security state transitions to the protection locked state. The key code to be authenticated is specified by a command parameter.

FIG. 1 is a state transition diagram of the security levels. The state transitions shown in FIG. 1 are controlled by the memory control sequencer 12.

By execution of the reset command in the protection unlocked state or by a reset operation of the microcomputer 10 in a state in which information in the key code memory area is disabled, the security state transitions to the unprotected state 1.

By execution of the set command in the unprotected state 1 or by authentication correctness as an authentication result of executing the authentication command in the protection locked state, the security state transitions to the protection unlocked state 2.

By authentication incorrectness (key code authentication mismatch) as an authentication result of executing the authentication command in the protection unlocked state 2 or by a reset operation of the microcomputer 10 in a state in which the key code is set in the key code memory area, the security state transitions to the protection locked state 3.

Figure 5:
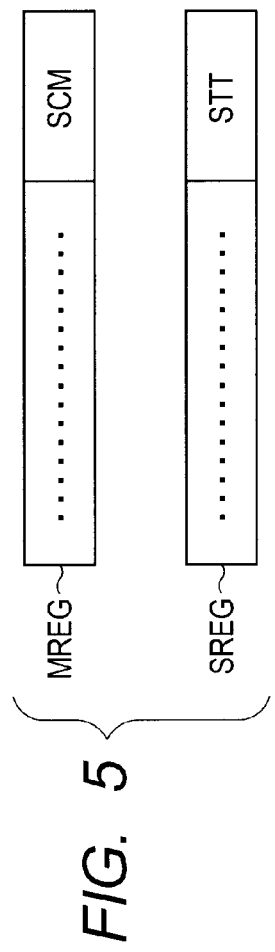
FIG. 5 is an explanatory diagram of a control mode register MREG and a security control status register SREG of a memory control sequencer.

FIG. 5 illustrates a control mode register MREG and a security control status register SREG of the memory control sequencer 12.

The control mode register MREG has a security control mode bit SCM. Setting the security control mode bit SCM to a first value (e.g., logical value "0") enables the execution of the set command, the reset command, and the authentication command. Setting the security control mode bit SCM to a second value (e.g., logical value "1") disables the change of the security state by the execution of the set command, the reset command, and the authentication command.

By adopting the security control mode bit SCM, the security state transition control using the key code can advantageously be switched to unselection as necessary. Even if the security state transition control is switched from selection to unselection by operating the security control mode bit SCM, the third security state or the second security state of this time is inhibited from transitioning to the first security state.

The security control status register SREG has a security control status code STT indicating the current security state by a plurality of bits in the security control mode. It is possible to easily confirm the security state in accordance with the need of an internal operation by the memory control sequencer 12, etc.

According to the security state transition control by the three levels, the setting and cancellation of the security states are determined based on the authority pertinent to the key code, so that it is possible to set and cancel the security states regardless of operation during system debug or in the case of incorporation in a real machine. Further, the key code is stored in the nonvolatile memory device 14 under protection, and in the stored state, the security state is at least the second security state. Further, the rewriting of the key code requires an authentication match, and external readout is disabled; therefore, the key code does not easily leak out. In this respect, the protection for the nonvolatile memory device 14 is highly reliable.

Further, a forced reset of the microcomputer 10 does not cancel the protection for the nonvolatile memory device 14. When the microcomputer 10 is reset in the first security state, the security state remains the first security state. Therefore, in system debugging having frequent reset operations, there is no inconvenience of protecting, by each reset, the nonvolatile memory device and disabling writing.

Figure 6:
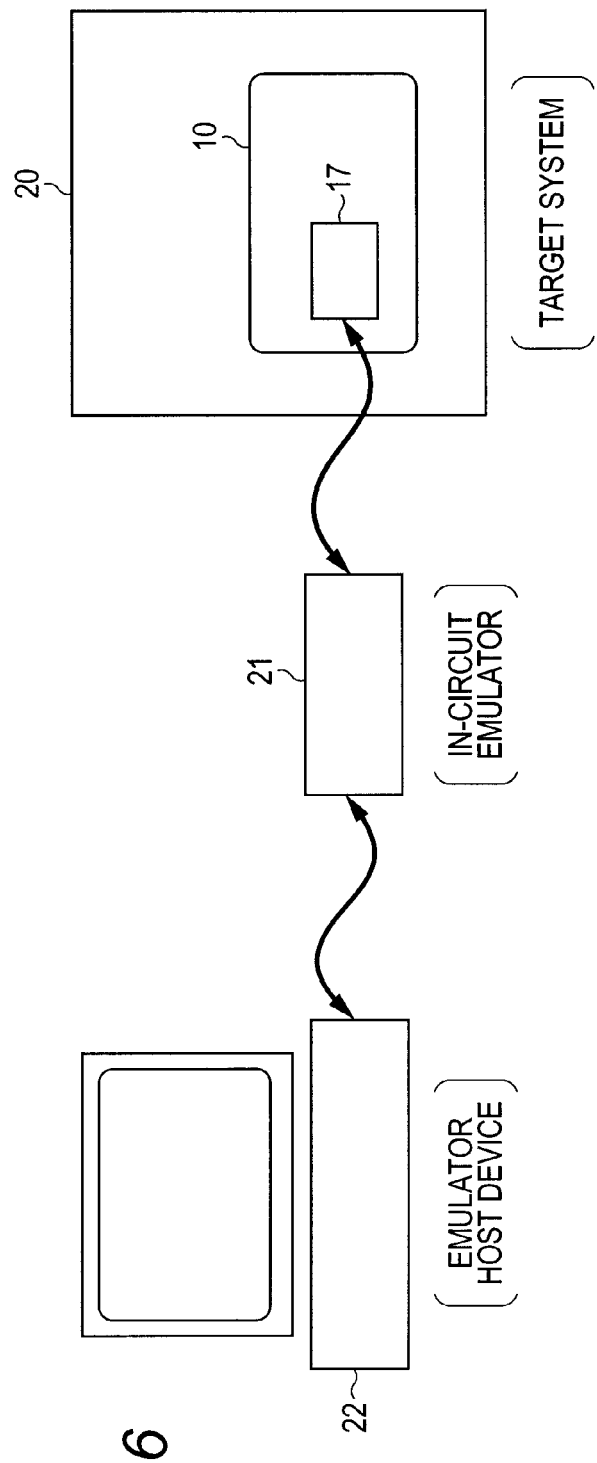
FIG. 6 is a system configuration diagram showing a debug environment using an emulator for a target system.

FIG. 6 illustrates a debug environment using an emulator for a target system. The target system 20 is, for example, a device incorporating the microcomputer 10. An in-circuit emulator 21 is coupled to the debug interface circuit 17 of the microcomputer 10 through an interface cable. The emulation operation of the in-circuit emulator 21 is controlled in accordance with an instruction from an emulator host device 22 configured with a personal computer or a workstation. The emulator host device 22 analyzes trace information, etc. obtained by the emulation operation. In the emulation operation, programs to be debugged are written to the nonvolatile memory device 14 and executed by the CPU 11 repeatedly. In the process, program rewriting and frequent resets are performed, and the result of program execution by the CPU 11 is analyzed.

Figure 7:
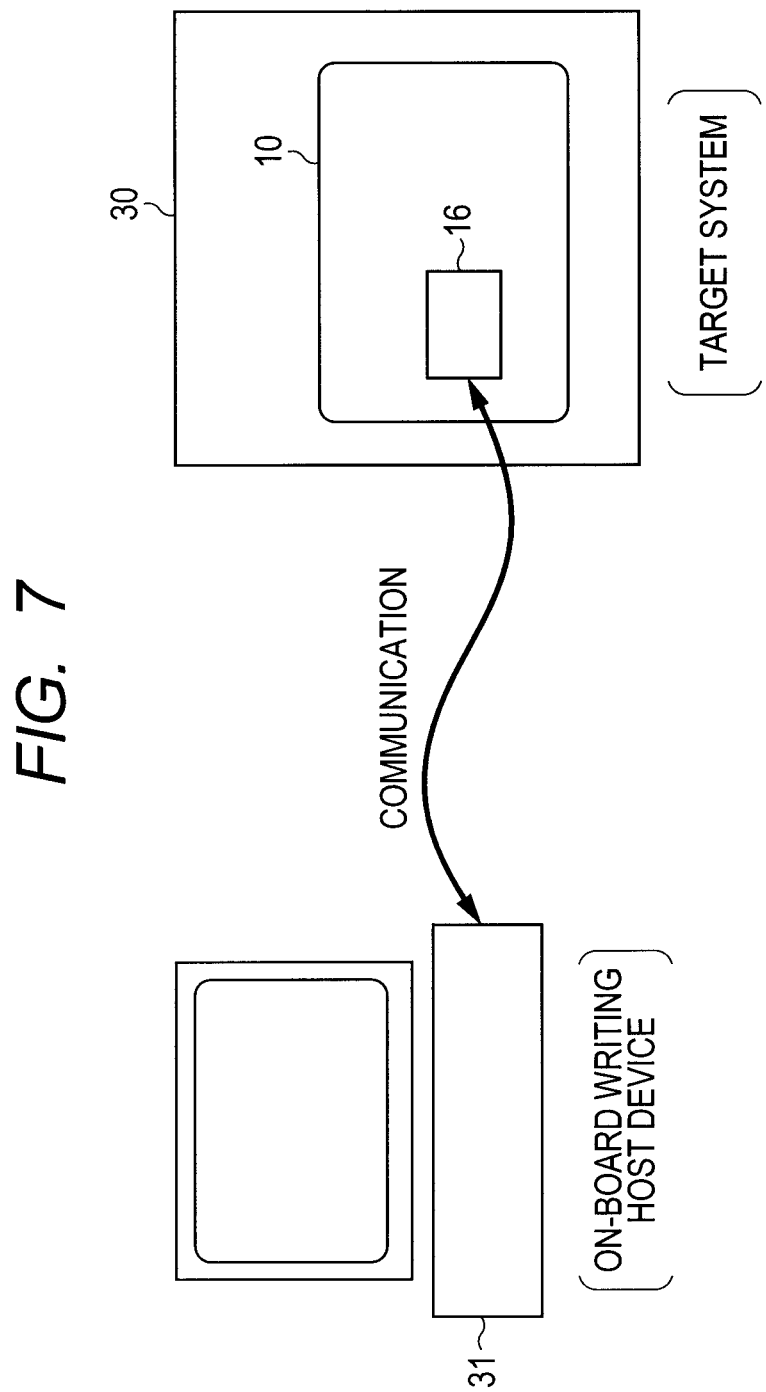
FIG. 7 is a system configuration diagram showing a maintenance environment for a target system.

FIG. 7 illustrates a maintenance environment for a target system. The target system 30 is, for example, a real machine including the microcomputer 10, such as an ECU mounted in an automobile. An on-board writing host device 31 configured with a personal computer or a workstation is coupled to the communication interface circuit 16 included in the microcomputer 10 of the target system 30 through a communication cable. The on-board writing host device 31 controls the rewriting or writing of programs, etc. stored in the nonvolatile memory device 14 through the communication interface circuit 16. The nonvolatile memory device 14 undergoes so-called on-board writing.

Figure 8:
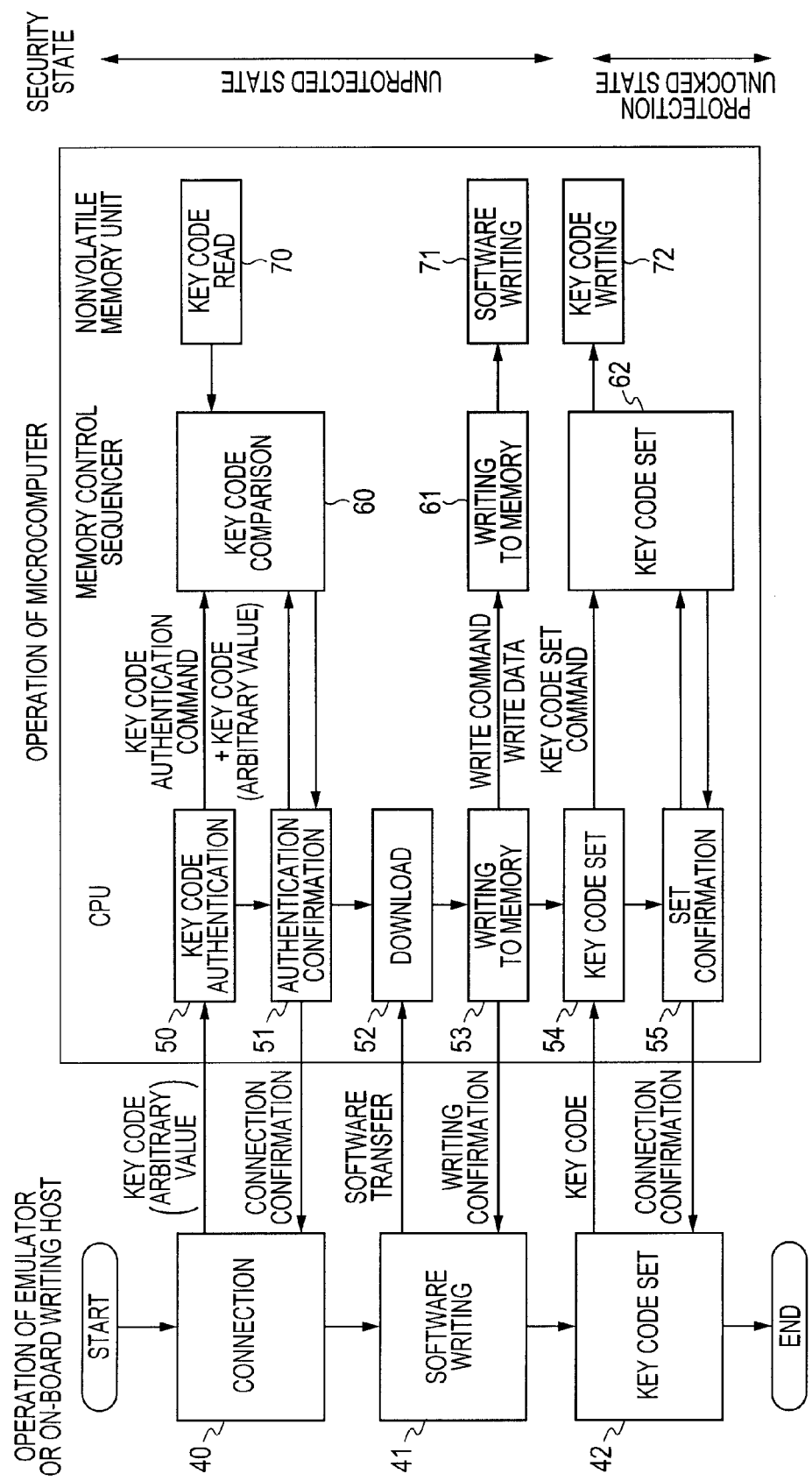
FIG. 8 is an explanatory diagram illustrating an operation procedure for writing software to the nonvolatile memory device in an initial state mounted over the microcomputer.

FIG. 8 illustrates an operation procedure for writing software to the nonvolatile memory device in an initial state mounted over the microcomputer 10. FIG. 8 shows the operation procedure without distinguishing between emulator writing in FIG. 6 and on-board writing in FIG. 7. FIG. 8 shows the operation procedure divided broadly into the operations of the emulator host device 22 or the on-board writing host device 31 (the operations of the host), the operations of the microcomputer 10 (the operations of the CPU, the memory control sequencer, and the nonvolatile memory unit), and the security states of the nonvolatile memory device 14.

Since a key code is not set in the nonvolatile memory device 14 at the start, the security state is the unprotected state, in which stored information is not protected.

First, the host device provides a key code to the microcomputer 10 and awaits connection confirmation (40).

The microcomputer 10 provides the key code received from the host device and a key code authentication command to the memory control sequencer 12 in key code authentication processing (50). The memory control sequencer 12 compares read data obtained by reading (70) from the key code area by the nonvolatile memory unit 13 with the key code, and sends the result back to the CPU 11 (60). The CPU 11 obtains an authentication result corresponding to the comparison result and sends connection confirmation back to the host device (51).

The host device transfers software to the CPU 11 and awaits writing confirmation (41). The CPU 11 downloads the software (52), and instructs the memory control sequencer 12 to write it to the memory (53). The memory control sequencer 12 controls a write operation on the nonvolatile memory unit 13, in accordance with a write command and write data (61), thereby writing the software to the nonvolatile memory unit 13 (71).

After receiving writing confirmation, the host device instructs the CPU 11 to write a key code and awaits connection confirmation (42). In response thereto, the CPU 11 issues a key code set command to the memory control sequencer 12 (54). In response to the command, the memory control sequencer 12 writes the key code specified by the command to the nonvolatile memory unit 13 (72). The CPU 11 confirms the completion of writing (55), and notifies this to the host device.

Thus, the specified key code is initially set in the key code area of the nonvolatile memory device 14. In this state, the security state is the protection unlocked state. In the next operation, if correctness as a key code authentication result cannot be obtained, the protection unlocked state cannot be maintained and transitions to the protection locked state, in which the software is protected.

Figure 9:
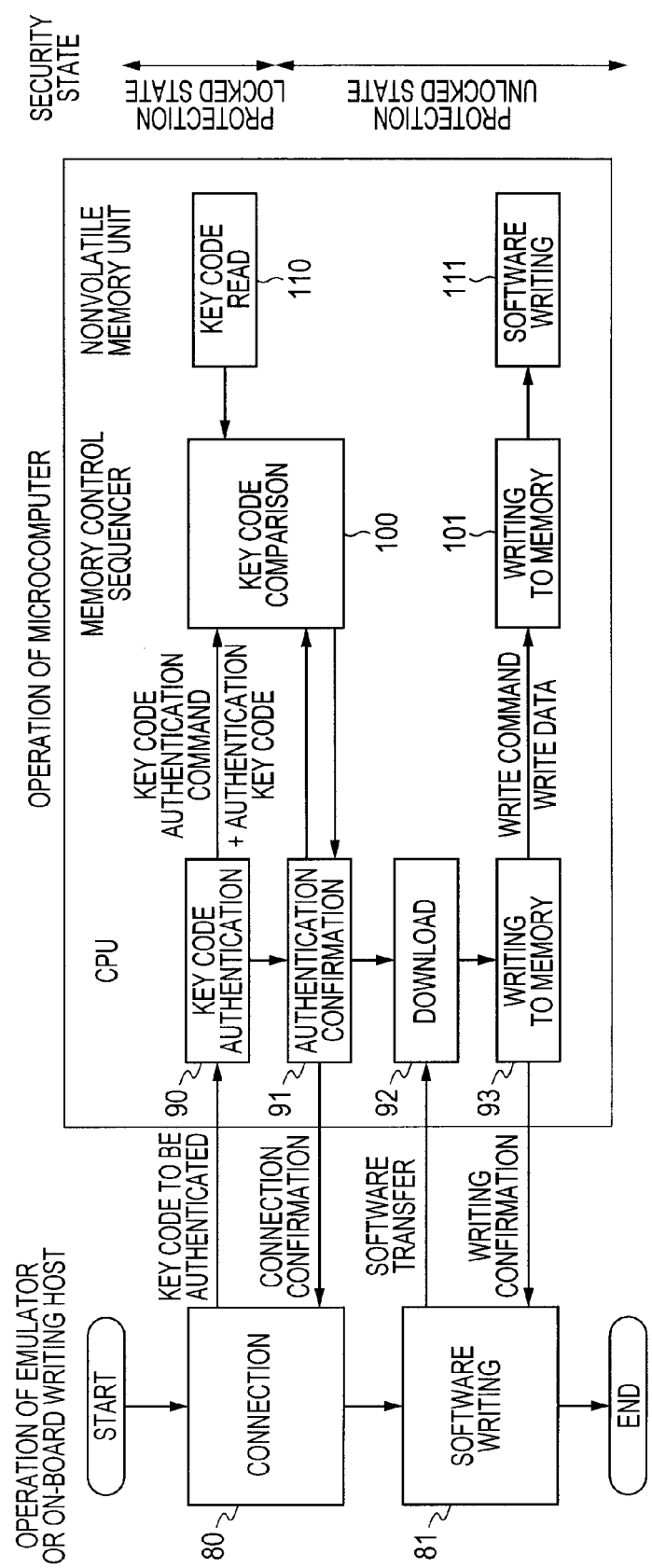
FIG. 9 is an explanatory diagram illustrating an operation procedure for rewriting software in the nonvolatile memory device in a protected state.

FIG. 9 illustrates an operation procedure for rewriting the software in the nonvolatile memory device in a protected state. Since the key code is set at the start, the security state is the protection locked state, in which the software is protected.

First, the host device provides a key code to be authenticated to the microcomputer 10 and awaits connection confirmation (80). The microcomputer 10 provides the key code received from the host device and a key code authentication command to the memory control sequencer 12 in key code authentication processing (90). The memory control sequencer 12 compares read data obtained by reading (110) from the key code area by the nonvolatile memory unit 13 with the key code, and sends the result back to the CPU 11 (100). In this example, assume that the result is a comparison match. The CPU 11 obtains an authentication result corresponding to the comparison result and sends connection confirmation back to the host device (91).

The host device transfers software to the CPU 11 and awaits writing confirmation (81). The CPU 11 downloads the software (92), and instructs the memory control sequencer 12 to write it to the memory (93). The memory control sequencer 12 controls a write operation on the nonvolatile memory unit 13, in accordance with a write command and write data (101), thereby writing the software to the nonvolatile memory unit 13 (111).

In the next operation, if correctness as a key code authentication result cannot be obtained, the protection unlocked state cannot be maintained and transitions to the protection locked state, in which the software is protected. In the case where it is necessary to protect the software while continuing the operation, key code authentication with a false key code causes the security state to transition to the protection locked state, in which the software can be protected.

Figure 10:
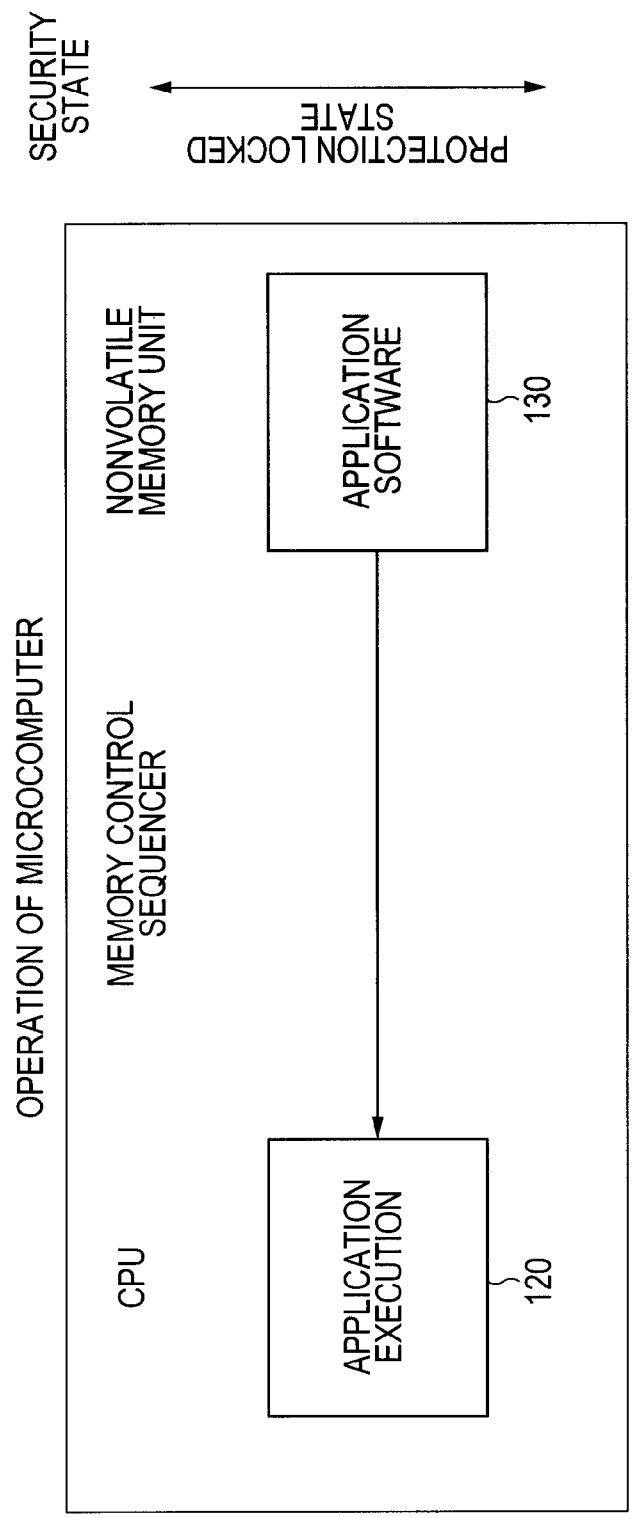
FIG. 10 is an explanatory diagram showing a state where a CPU executes an application program in a protection locked state.

FIG. 10 shows a state where the CPU 11 executes an application program in the protection locked state. As described, rewriting the nonvolatile memory device is inhibited in the protection locked state, and key code authentication is needed for rewriting. However, as long as the nonvolatile memory device 14 is used as a program read only memory, it is not necessary to change the security level. The CPU 11 only reads and executes (120) application software (130) sequentially read from the nonvolatile memory device 14.

Figure 11:
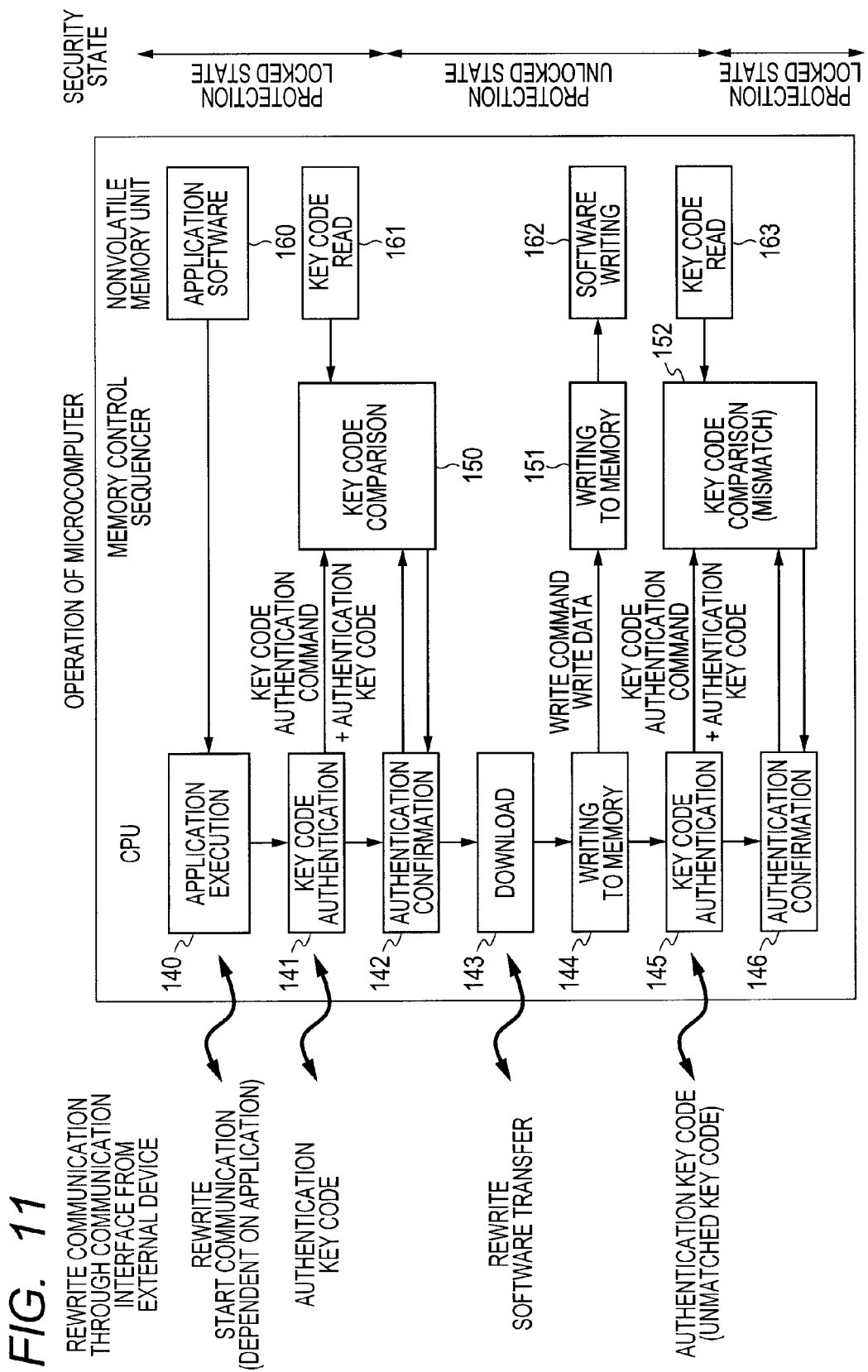
FIG. 11 is an explanatory diagram illustrating an operation procedure for rewriting the nonvolatile memory device based on an application program which the microcomputer executes on a real machine.

FIG. 11 illustrates an operation procedure for rewriting the nonvolatile memory device based on an application program which the microcomputer executes on a real machine. The CPU 11 executes application software (160) stored in the nonvolatile memory unit 13 in the protection locked state (140). At the time of rewriting the nonvolatile memory unit 13 in the process, first the CPU 11 provides a key code specified based on the application software and a key code authentication command to the memory control sequencer 12 in key code authentication processing (141). The memory control sequencer 12 compares read data obtained by reading (161) from the key code area by the nonvolatile memory unit 13 with the key code, and sends the result back to the CPU 11 (150). In the case of a comparison match, the security state of the nonvolatile memory device 14 transitions to the protection unlocked state. The CPU 11 confirms an authentication result corresponding to the comparison result (142). In the case of a comparison mismatch, the CPU 11 performs exception processing, etc. (not shown). In the case of the comparison match, the CPU 11 downloads the software (143), and instructs the memory control sequencer 12 to write it to the memory (144). The memory control sequencer 12 controls a write operation on the nonvolatile memory unit 13, in accordance with a write command and write data (151), thereby writing the software to the nonvolatile memory unit 13 (162).

After the write processing (144), the CPU 11 performs key code authentication processing (145), and provides code information that does not match a proper key code and a key code authentication command to the memory control sequencer 12. The memory control sequencer 12 compares read data obtained by reading (163) from the key code area by the nonvolatile memory unit 13 with the code information, and sends the result back to the CPU 11 (152). By a comparison mismatch, the security state of the nonvolatile memory device 14 transitions from the protection unlocked state to the protection locked state. The CPU 11 confirms an authentication result corresponding to the comparison result (146). In the case of the comparison mismatch, the CPU 11 performs exception processing, etc. (not shown). After the comparison mismatch is confirmed, the next processing is started in the protection locked state, based on the rewritten application software, though not particularly limited.

Figure 12:
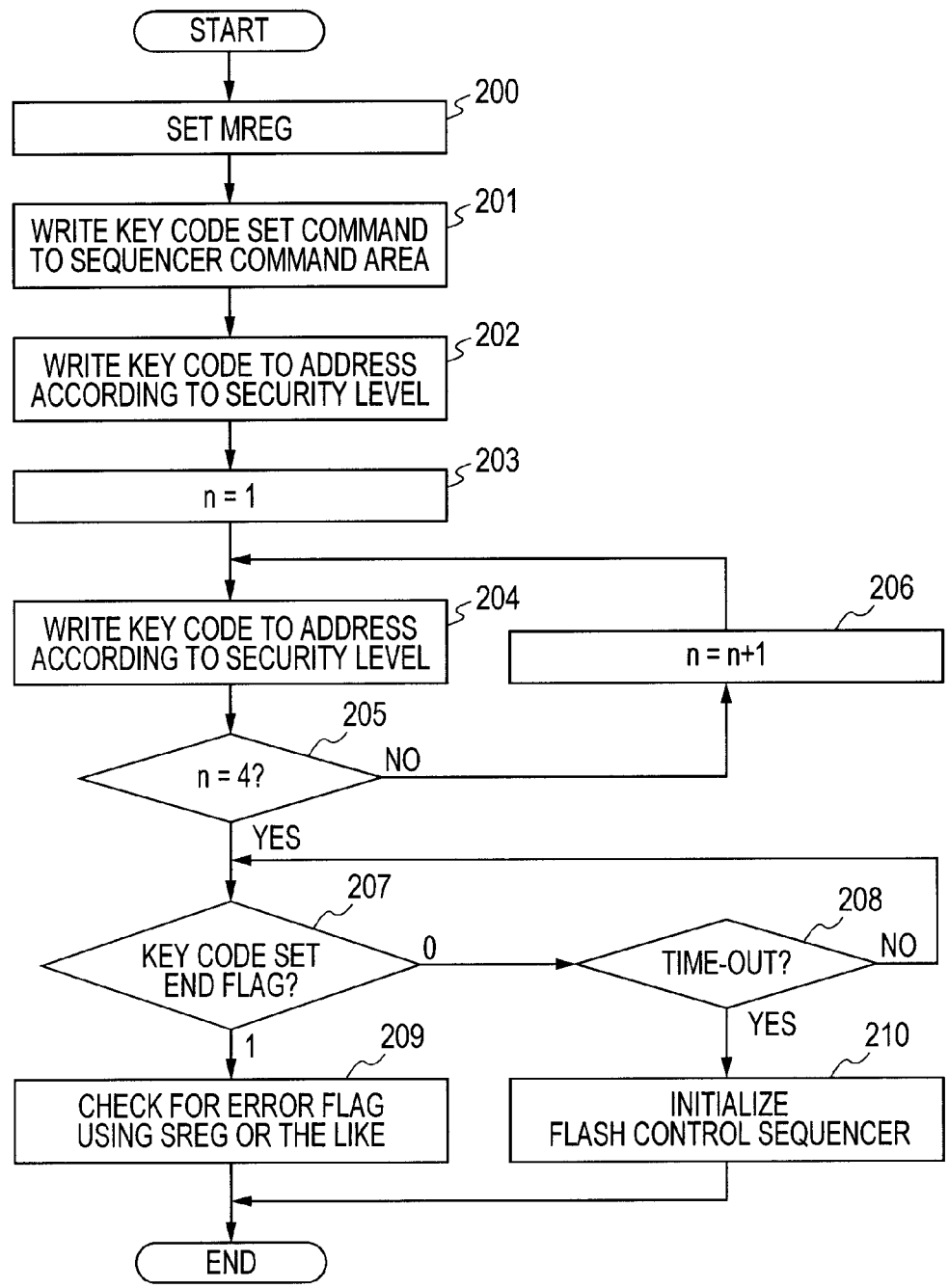
FIG. 12 is a flowchart illustrating a key code set operation procedure.

FIG. 12 shows a key code set operation procedure. First, the security control mode bit SCM of the control mode register MREG is set to "1" (200). Then, a key code set command is written to a command register of the memory control sequencer 12 (201). The key code set command, though not particularly limited, corresponds to a write command with the address of a buffer data register for the key code and the key code to be set. The operations thereof are controlled by the CPU 11. In accordance with the key code set command, the memory control sequencer 12 starts to write the key code (202). In this example, assume that four write cycles are required to write the key code, though not particularly limited. To manage the number of write cycles, a variable n is set to an initial value 1 (203), and the next write cycle is executed (204). Until the number of write cycles reaches four, the writing in step 204 is repeated (205) while the variable n is updated to n+1 (206). While the CPU 11 confirms whether or not a key code set end flag is set (207); if a write verify operation time necessary for writing has elapsed (yes in 208), the flash control sequencer 12 is initialized and the write request by this key code set command is cleared (210). If it is confirmed that the key code set end flag is set ("1" in 207), the status register SREG or the like is read for error check (209). That is, it is confirmed by the status STT that the security state is the protection locked state by this write and verify operation. Thereby, the key code is set in the nonvolatile memory unit 13, and the nonvolatile memory device goes into the protection locked state.

Figure 13:
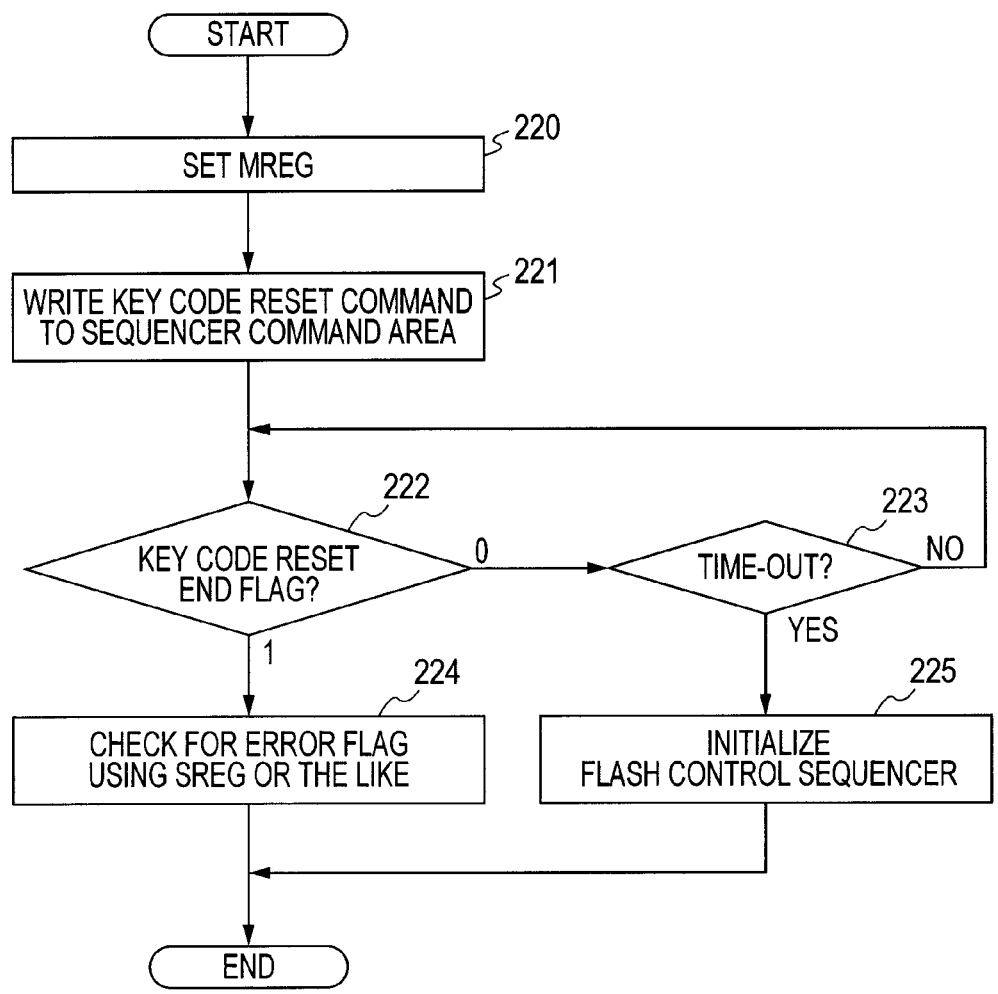
FIG. 13 is a flowchart illustrating a key code reset operation procedure.

FIG. 13 shows a key code reset operation procedure. First, the security control mode bit SCM of the control mode register MREG is set to "1" (220). Then, a key code reset command is written to the command register of the memory control sequencer 12 (221). The key code reset command, though not particularly limited, corresponds to an erase command for identifying the address of the key code area. The operations thereof are controlled by the CPU 11. In accordance with the key code reset command, the memory control sequencer 12 starts to erase the key code after confirming that the current security state is the protection unlocked state. If the current security state is not the protection unlocked state, the reception of the command is rejected. While the CPU 11 confirms whether or not a key code reset end flag is set (222); if an erase time necessary for erasing has elapsed (yes in 223), the flash control sequencer 12 is initialized and the erase request by this key code reset command is cleared (225). If it is confirmed that the key code reset end flag is set ("1" in 222), the status register SREG or the like is read for error check (224). That is, it is confirmed by the status STT that the security state is the unprotected state by this erase and verify operation. Thereby, the nonvolatile memory device goes into the unprotected state.

Figure 14:
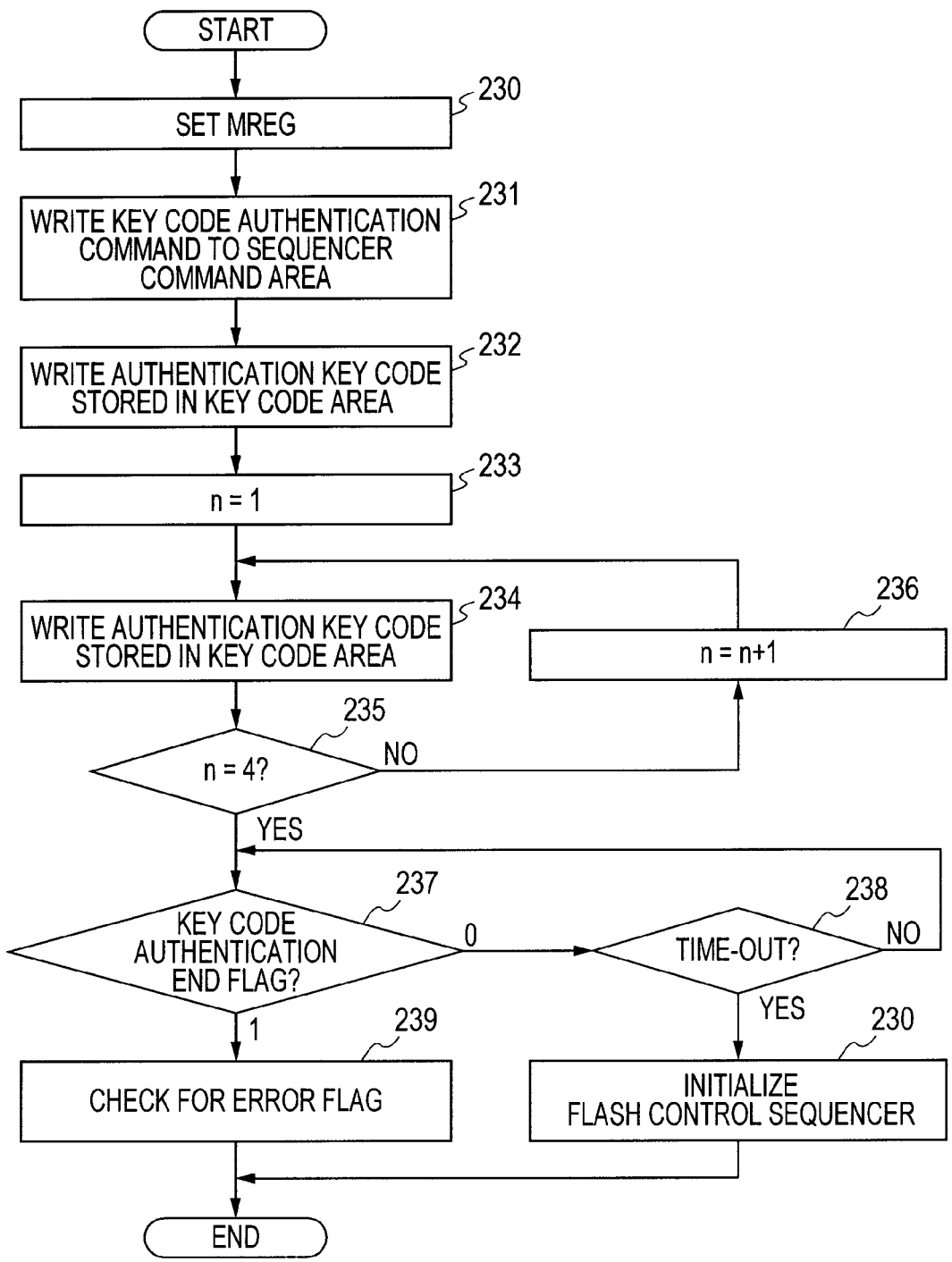
FIG. 14 is a flowchart illustrating a key code authentication operation procedure.

FIG. 14 shows a key code authentication operation procedure. First, the security control mode bit SCM of the control mode register MREG is set to "1" (230). Then, a key code authentication command is written to the command register of the memory control sequencer 12 (231). The key code authentication command, though not particularly limited, corresponds to a write verify command with the address of the buffer data register for the key code and the key code to be authenticated. The operations thereof are controlled by the CPU 11. In accordance with the key code authentication command, the memory control sequencer 12 starts an authentication operation by a verify operation for comparing the key code read from the nonvolatile memory unit 13 with the key code to be authenticated stored in the buffer data register (232). In this example, assume that four verify cycles are required to authenticate the key code, though not particularly limited. To manage the number of verify cycles, a variable n is set to an initial value 1 (233), and the next verify cycle is executed (234). The verification in step 234 is repeated until the number of verify cycles reaches four (235) while the variable n is updated to n+1 (236). While the CPU 11 confirms whether or not a key code authentication end flag is set (237); if a verify operation time necessary for verification has elapsed (yes in 238), the flash control sequencer 12 is initialized and the authentication request by this key code authentication command is cleared (240). If it is confirmed that the key code authentication end flag is set ("1" in 237), the status register SREG or the like is read for error check (239). That is, it is confirmed by the status STT that the security state is the protection unlocked state by this key code authentication operation. Thereby, the key code is set in the nonvolatile memory unit 13, and the nonvolatile memory device goes into the protection locked state.

According to the first embodiment, the following operational effects can be obtained.

It is possible to prevent a third person from illegally copying or analyzing software written to the nonvolatile memory device included in the semiconductor device.

It is possible to prevent a third person from illegally erasing/rewriting an on-chip nonvolatile memory device in a semiconductor device incorporated in a device traded or distributed in a market to reuse hardware of an electrical unit using the semiconductor device or produce an illegally modified electrical unit implementing malicious software.

The function of writing/erasing the nonvolatile memory device included in the semiconductor device by an authorized person who knows the key code is not impaired.

Without impairing the function of rewriting in the market which is a feature of the semiconductor device incorporating the erasable programmable nonvolatile memory device, the protection state (security state) of software in the nonvolatile memory device can be set according to the purpose, which can inhibit a third person from illegally analyzing application software or modifying the system.

Second Embodiment

In the second embodiment, description will be made of an example in which the microcomputer described in the first embodiment is incorporated in an automotive electrical unit.

Figure 15:
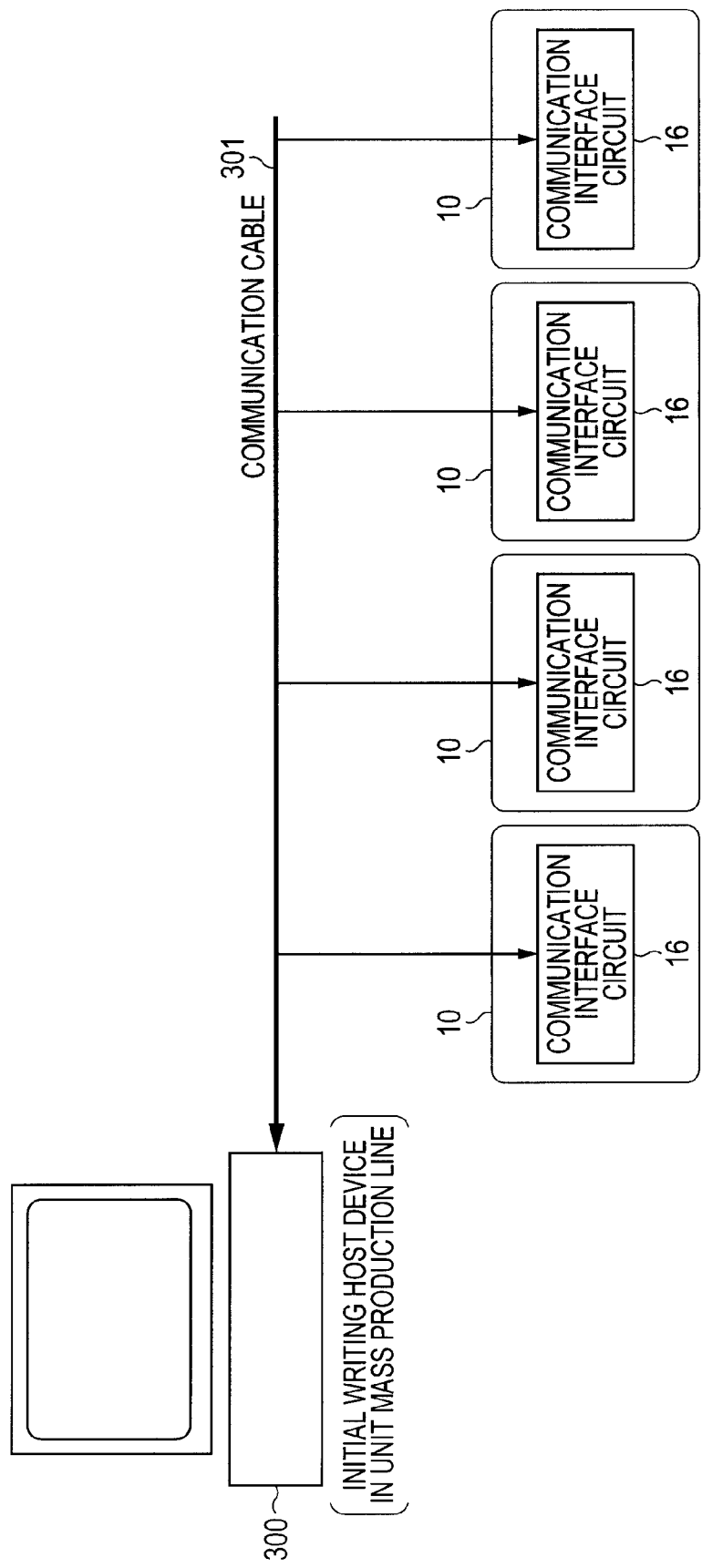
FIG. 15 is a system configuration diagram illustrating an operational configuration of initial writing to the nonvolatile memory device in mass production for an electrical unit incorporating the microcomputer described in the first embodiment.

FIG. 15 illustrates an operational configuration of initial writing to the nonvolatile memory device in mass production for an electrical unit incorporating the microcomputer described in the first embodiment.

Reference numeral 300 denotes an initial writing host device in an electrical-unit mass production line, and a lot of microcomputers 10 are coupled thereto through a communication cable 301. Communication interface circuits 16 are used as connection interfaces. Initial write operations are performed in parallel on nonvolatile memory devices 14 respectively mounted over the microcomputers 10. For example, software write operations illustrated in FIG. 8 are performed in parallel on all the microcomputers 10.

Figure 16:
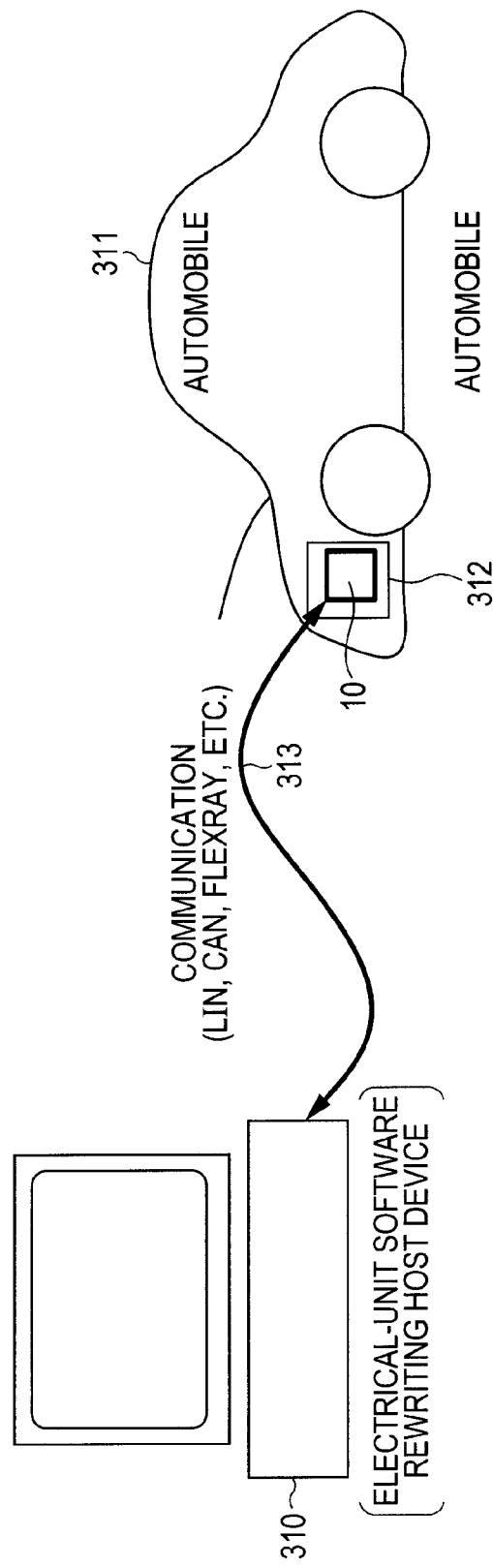
FIG. 16 is a system configuration diagram illustrating an operational configuration of writing to the nonvolatile memory device during the maintenance of an electrical unit mounted in an automobile.

FIG. 16 illustrates an operational configuration of writing to the nonvolatile memory device during the maintenance of an electrical unit mounted in an automobile. Reference numeral 310 denotes an electrical-unit software rewriting host device installed in a car dealer or the like, and the microcomputer 10 in an electrical unit 312 mounted in an automobile to be maintained is coupled thereto through a communication cable 313. The communication interface circuit 16 is used as a connection interface. The host device 310 rewrites software in the nonvolatile memory device 14, for example, in accordance with the software rewrite operation procedure illustrated in FIG. 11.

Figure 17:
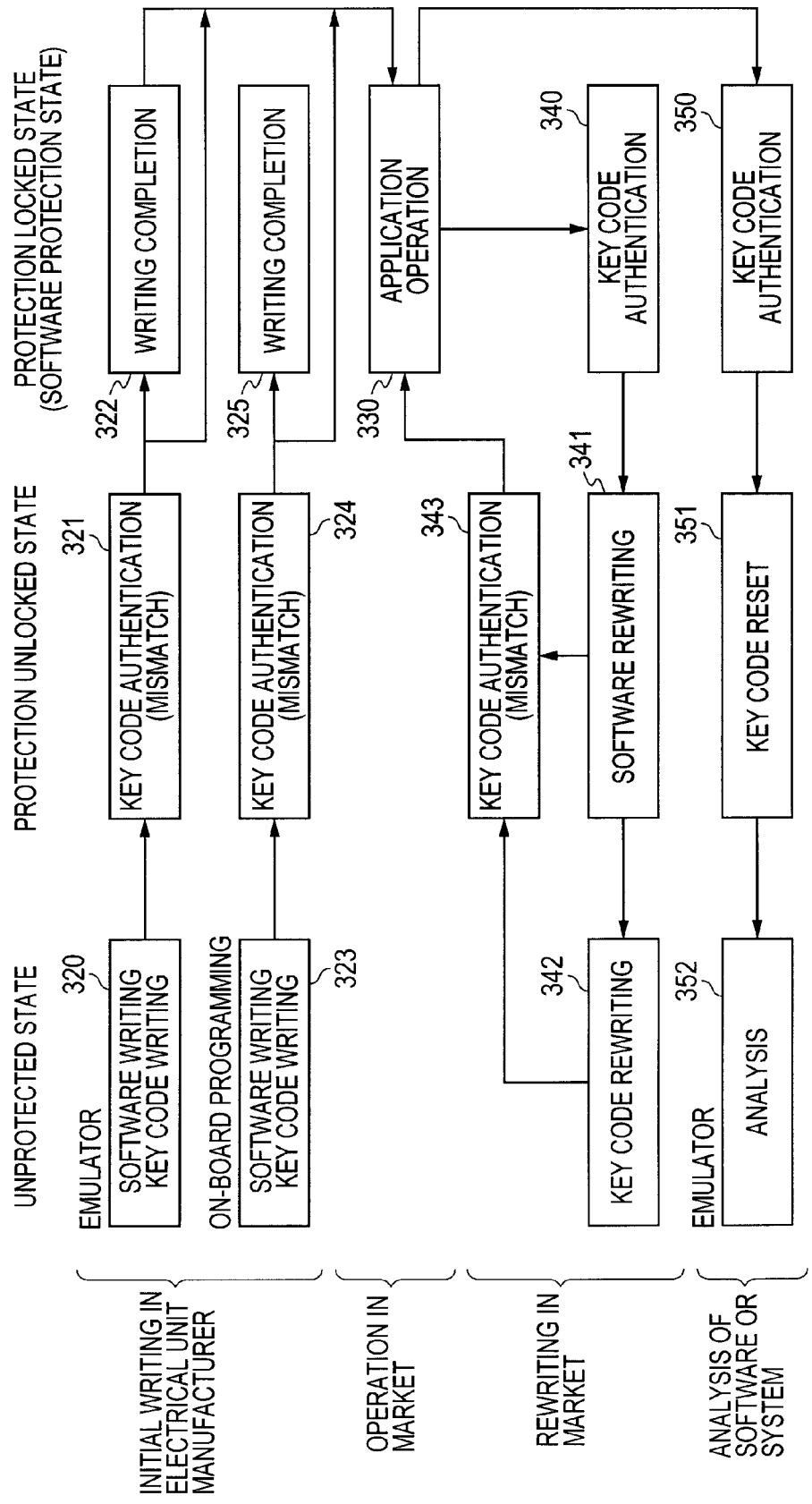
FIG. 17 is a flowchart generally showing the transition states of the security protection of the nonvolatile memory device in the microcomputer applied in an automotive electrical unit.

FIG. 17 generally shows the transition states of the security protection of the nonvolatile memory device in the microcomputer 10 applied in an automotive electrical unit. FIG. 17 shows the transition states divided broadly into the phases of initial writing to the automotive electrical unit in a manufacturer (electrical unit manufacturer), an operation in the market (operation in a running automobile), rewriting in the market (software rewriting in a car dealer or the like), and software or system analysis (characteristic or failure analysis in an automobile manufacturer or a car dealer).

The initial writing of software in the electrical unit manufacturer can be implemented by software and key code writing using the emulator illustrated in FIG. 6 (320) or software and key code writing by on-board writing illustrated in FIG. 7 (323) in the unprotected state.

After the writing in step 320, the security state transitions to the protection unlocked state, where a key code authentication mismatch is generated (321), so that the security state transitions to the protection locked state, thus completing the writing (322). Similarly, after the writing in step 323, the security state transitions to the protection unlocked state, where a key code authentication mismatch is generated (324), so that the security state transitions to the protection locked state, thus completing the writing (325).

In the market, in the protection locked state as the write completion state (322, 325) or the protection locked state by the key code authentication mismatch (321, 324), the CPU 11 executes software written to the nonvolatile memory device 14, thereby performing an application operation (330). In this case, as a matter of course, erasing and writing to the nonvolatile memory device 14 and reading from the key code area are inhibited. In the application operation state (330), by determining correctness in key code authentication (340), the software can be rewritten (341) in the protection unlocked state. After software writing; by a key code authentication mismatch (343), the security state transitions to the state in which the application is operable (330) in the protection locked state again. After the software rewriting in step 341; by a key code reset operation and key code rewriting (342) and by a key code authentication mismatch (343), the security state transitions to the state in which the application is operable (330) in the protection locked state again. On the other hand, in the necessity of system analysis, by key code authentication (350) in the protection locked state and by key code reset (351) in the protection unlocked state, the security state transitions to the unprotected state, where system analysis (352) can be performed using the emulator or the like.

According to the electrical unit incorporating the microcomputer according to the first embodiment, the following operational effects can be obtained.

In unit development at the electrical unit manufacturer, the in-circuit emulator can be used, and also the writing of software to the on-chip nonvolatile memory device 14 can be performed by the emulator. If the software needs to be protected, the key code is set by the emulator, thereby making it possible to protect the software.

On-board writing can be used for initial writing in unit mass production at the electrical unit manufacturer. Since write time, throughput, cost, and the like are important factors in mass production; in general, multiple write operations are performed in parallel. Accordingly, as illustrated in FIG. 15, on-board write operations are performed in parallel on the microcomputers. If the software needs to be protected in electrical-unit shipment, the key code is set along with the initial writing, thereby making it possible to protect the software after the unit shipment.

Rewriting in the market is performed in the user application operation state. For rewriting in the market, in terms of safety or security, it is appropriate to rewrite software at a site, such as a car dealer, which can provide maintenance services. Even though the security state is the protection locked state in which the key code is set for software protection in shipment; in rewriting, a communication protocol prepared beforehand in the user application is used, thereby making it possible to implement key code authentication and rewriting.

In analysis at the electrical unit manufacturer, it is necessary to analyze the electrical unit and the microcomputer. If some kind of analysis or check is necessary for the electrical unit or the microcomputer operating in the market, it is necessary to remove the unit from the automobile and analyze it using a debug tool such as the in-circuit emulator. Even though, in the market, software is protected in the protection locked state in which the key code is set, key code authentication can be performed through the debug interface for connecting the emulator, thereby enabling some kind of analysis or check.

Thus, in the case where the microcomputer 10 is applied in an automotive powertrain control system, it is possible to prevent a third person from analyzing software developed by a set maker of the control system. It is possible to prevent a third person from analyzing anti-theft software such as an immobilizer. It is possible to prevent illegal modification by the falsification of software. It is possible to rewrite software in the market for the purpose of measures against software bugs, addition of a function or the like. For example, it is possible to update software at the car dealer due to a recall.

Third Embodiment

<<Microcomputer>>

In the third embodiment, description will be made of an example in which the nonvolatile memory device has five security states.

Figure 18:
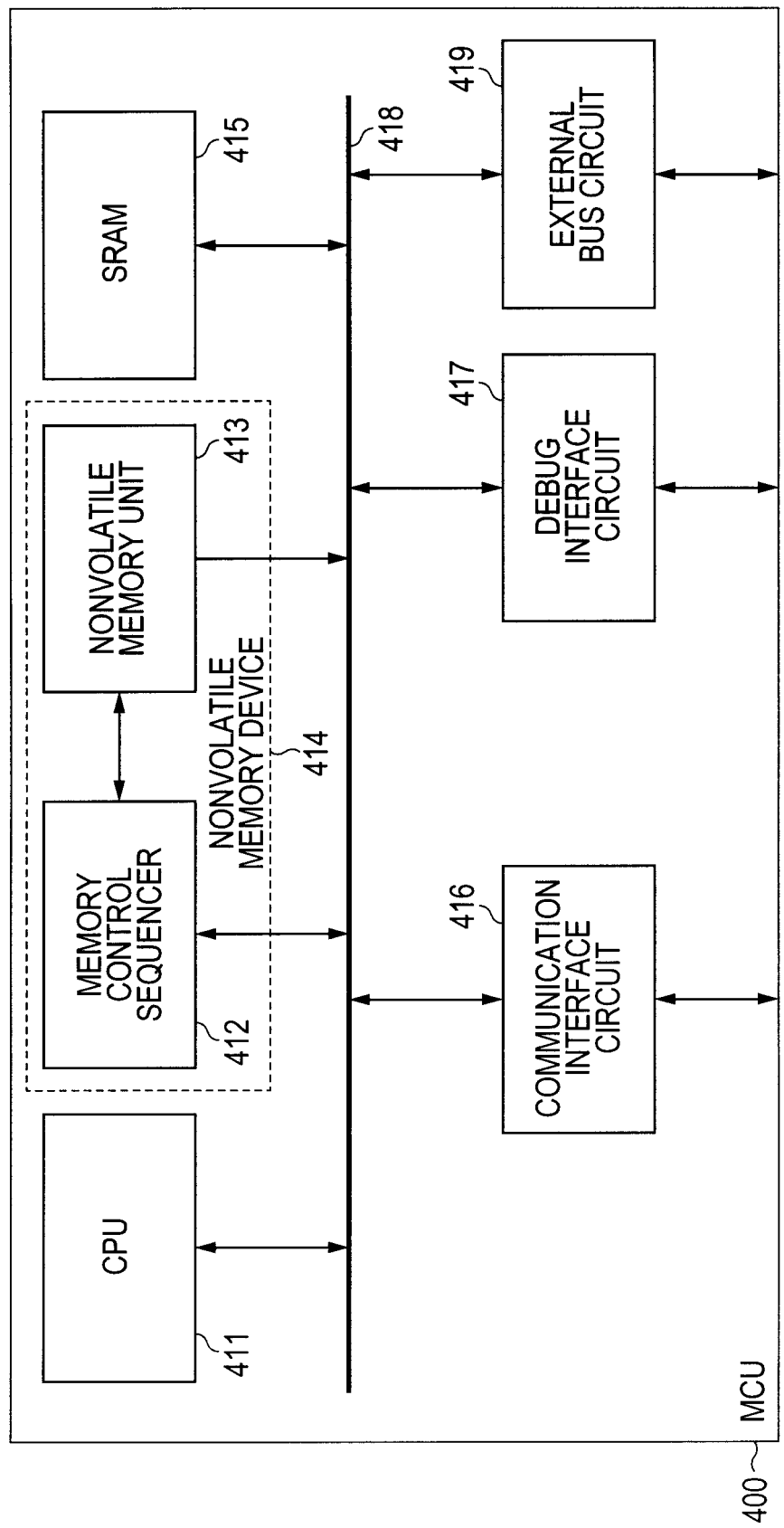
FIG. 18 is a block diagram of a microcomputer according to a third embodiment of the invention.

FIG. 18 illustrates the configuration of a microcomputer as another example of the semiconductor device according to the invention. The microcomputer (MCU) 400, though not particularly limited, is formed over a single semiconductor substrate such as monocrystal silicon, using a complementary MOS integrated circuit manufacturing technology or the like.

The microcomputer 400 includes an electrically erasable programmable nonvolatile memory device 414, a central processing unit (CPU) 411 for executing instructions, a Static Random Access Memory (SRAM). 415 for use as a work area or the like for the central processing unit 411, a first external interface circuit (debug interface circuit) 417 which is assigned as a debug-specific external interface, a second external interface circuit (communication interface circuit) 416 which is assigned as another external interface, and an external bus circuit 419, and these units are coupled to an internal bus 418. The internal bus 418 may be hierarchized.

The nonvolatile memory device 414 includes a nonvolatile memory unit 413 having an array of nonvolatile memory cells and a memory control unit (memory control sequencer) 412 for controlling erase, write, and read operation procedures for memory cells of the nonvolatile memory unit 413. The memory control sequencer 412 receives access commands, addresses, write data, and the like from the CPU 411, and controls erase, write, and read operations on the nonvolatile memory unit 413. Read data is outputted from the nonvolatile memory unit 413 to the internal bus 418. The nonvolatile memory device 414 is, for example, a flash memory, an Electrically Erasable and Programmable Read Only Memory (EEPROM), or a Magnetoresistive Random Access Memory (MRAM).

The communication interface circuit 416 and the debug interface circuit 417 may be the same as in the first embodiment.

The external bus circuit 419 is coupled to, for example, a memory bus circuit over a board for debug or in an automotive electronic control system. The memory bus over the board is coupled to, for example, a Static Random Access Memory (SRAM), a flash memory, an Electrically Erasable and Programmable Read Only Memory (EEPROM), a Magnetoresistive Random Access Memory (MRAM) or the like, where instructions and data from the central processing unit are stored.

The memory control sequencer 412 performs memory access control and security control to inhibit unauthorized erasing, writing to, and reading from the nonvolatile memory unit 413.

<<Five-state Security Levels>>

FIG. 20 illustrates the security states (security levels) of the nonvolatile memory device 414. The illustrated security levels are comprised of five states which are an unprotected state (first security state), a first protection unlocked state (second security state), a first protection locked state (third security state), a second protection unlocked state (fourth security state), and a second protection locked state (fifth security state). In the following description, the first protection unlocked state, the first protection locked state, the second protection unlocked state, and the second protection locked state are also referred to as a protection unlocked state of a security level 1, a protection locked state of the security level 1, a protection unlocked state of a security level 2, and a protection locked state of the security level 2, respectively.

In the unprotected state, when a first key code and a second key code are not set in the nonvolatile memory device 414, reading from the nonvolatile memory device 414 is permitted, rewriting the nonvolatile memory device 414 is permitted, and external output from the communication interface circuit 416 and the debug interface circuit 417 is permitted. That is, software, etc. stored in the nonvolatile memory device 414 are not protected.

In the protection unlocked state of the security level 1, when the first key code is set in the nonvolatile memory device 414, reading from the nonvolatile memory device 414 is permitted, rewriting the nonvolatile memory device 414 is permitted on the condition that a result of authentication using the key code is correct, and external output from the communication interface circuit 416 and the debug interface circuit 417 is permitted. In this state, the protection of software, etc. stored in the nonvolatile memory device 414 is temporarily canceled in the case where an authentication result is correct.

In the protection locked state of the security level 1, when the first key code is set in the nonvolatile memory device 414, rewriting the nonvolatile memory device 414 is inhibited until correctness as a result of authentication using the key code is confirmed, reading from the nonvolatile memory device 414 is inhibited under a predetermined condition, and external output from the communication interface circuit 416 and the debug interface circuit 417 is permitted. That is, software, etc. stored in the nonvolatile memory device 414 are protected.

In the protection unlocked state of the security level 2, when the second key code is set in the nonvolatile memory device 414, reading from the nonvolatile memory device 414 is permitted, rewriting the nonvolatile memory device 414 is permitted on the condition that a result of authentication using the key code is correct, and external output from the communication interface circuit 416 and the debug interface circuit 417 is permitted. The protection unlocked state of the security level 2 differs from the protection unlocked state of the security level 1 only in that the different key code is used.

In the protection locked state of the security level 2, when the second key code is set in the nonvolatile memory device 414, rewriting the nonvolatile memory device 414 is inhibited until correctness as a result of authentication using the key code is confirmed, reading from the nonvolatile memory device 414 is inhibited under the predetermined condition, the interface operation of the debug interface circuit 417 is disabled, and external output from the communication interface circuit 416 is permitted. The protection locked state of the security level 2 differs from the protection locked state of the security level 1 in that the different key code is used and the interface operation of the debug interface circuit 417 is disabled.

The read inhibit under the predetermined condition refers to that after detection of an instruction fetch in external address space via the external bus circuit 419 by the central processing unit 411. In the protection locked states of the security levels 1 and 2, by outputting, from the nonvolatile memory device 414, a predetermined value independent of reading from the memory or a random value different from the output data of the nonvolatile memory device, it is possible to protect the software stored in the nonvolatile memory device 414. In a regular state of executing a program stored in the nonvolatile memory device 414 in a rewrite inhibit state, a fraud is assumed to start by causing the CPU 411 to fetch a malicious program from the external address space via the external bus circuit 419. Accordingly, in the regular program execution state prior thereto, data readout from the nonvolatile memory device 414 to the outside is permitted, and after an occurrence of an instruction fetch cycle assumed to be a fraud from the external space, information stored in the nonvolatile memory device 414 is not outputted to the outside at all, thus placing the highest priority on the protection of the stored information.

Further, under the predetermined condition in the protection locked states of the security levels 1 and 2, regular data stored in the nonvolatile memory device 414 does not exist outside the nonvolatile memory device 414 in any sense, and even though the regular data is inhibited from being outputted outside the microcomputer 400, it is also possible to inhibit retention over the internal bus or buffer.

FIG. 21 illustrates operation commands pertinent to the security states. The memory control sequencer 412 has a key code set command, a key code reset command, and a key code authentication command, as a set of operation commands for controlling the security states.

The key code set command is a command for an operation (key code set) for writing a key code inputted from the external interface circuits 416 and 417 to a predetermined memory area (key code memory area) in the nonvolatile memory unit 413. The key code set is enabled in the unprotected state or the protection unlocked state. When the key code is set, the security level 1 or 2 is selected by different designation of an address for storing the key code. The address for storing the key code refers to the address of a data register of the memory control sequencer 412, but does not refer to a memory address of the nonvolatile memory unit. That is, the key code to be set is specified by the register address as a command parameter. Therefore, the values of the first and second key codes may be the same or different, i.e., arbitrary values. Although not particularly limited, the memory control sequencer 412 disables a request for read access to the key code area provided via the bus 418. By disabling an unauthorized read request as well as unauthorized rewriting, the key code is completely protected.

The key code reset command and the key code authentication command are the same as in the first embodiment. The memory control sequencer 412 determines a key code to be reset or a key code to be authenticated, based on the security state.

FIG. 19 is a state transition diagram of the security levels. The state transitions shown in FIG. 19 are controlled by the memory control sequencer 412.

By execution of the reset command in the protection unlocked state or by a reset operation of the microcomputer 400 in a state in which information in the key code memory area is disabled, the security state transitions to the unprotected state 1.

By execution of the set command of the first key code (key code of the level 1) in the unprotected state 1 or by authentication correctness as an authentication result of executing the authentication command in the protection locked state 3A of the security level 1, the security state transitions to the protection unlocked state 2A of the security level 1.

By authentication incorrectness (key code authentication mismatch) as an authentication result of executing the authentication command in the protection unlocked state 2A of the security level 1 or by a reset operation of the microcomputer 400 in a state in which the key code of the level 1 is set in the nonvolatile memory unit 413, the security state transitions to the protection locked state 3A of the security level 1.

By execution of the set command of the second key code (key code of the level 2) in the unprotected state 1, by authentication correctness (authentication match) as an authentication result of executing the authentication command in the protection locked state 3B of the security level 2, or by execution of the set command of the second key code (key code of the level 2) in the protection unlocked state 2A of the security level 1, the security state transitions to the protection unlocked state 2B of the security level 2.

By authentication incorrectness (key code authentication mismatch) as an authentication result of executing the authentication command in the protection unlocked state 2B of the security level 2 or by a reset operation of the microcomputer 400 in a state in which the key code of the level 2 is set in the nonvolatile memory unit 413, the security state transitions to the protection locked state 3B of the security level 2.

Although not shown, the control mode register MREG of the memory control sequencer 412 is the same as in the first embodiment, and the security control status code STT of the security control status register SREG has the number of bits for indicating the five security states by different codes.

The other configurations and basic operations are the same as in the first embodiment, and their detailed descriptions are omitted.

According to this embodiment of the security state transition control by the five levels, it is possible to operate, with only transitions to the unprotected security state 1 and the protection unlocked and protection locked security states of the level 2, such a processing entity as merely rewrites the nonvolatile memory device 414. This prevents the nonvolatile memory device 414 from being easily attacked by unauthorized access in the microcomputer 400 through the use of the debug-specific interface circuit 417 having the interface specification disclosed. More specifically, in the first embodiment, if a match is made in key code authentication in a state of maintaining the security in the protection locked state, the connection of the in-circuit emulator to the debug interface is permitted, thereby enabling debugging. That is, by performing a 'brute force' attack on the key code of a finite combination, there is a potential of enabling the connection of the emulator even by a third person who does not originally know the key code. Accordingly, by preparing the two types of protection locked states which are the protection locked state of the level 1 in which the connection of the interface to the emulator is permitted by key code authentication and the protection locked state of the level 2 in which the interface to the emulator cannot be used at all, it is possible to further improve the security. On the other hand, by enabling transitions to the protection unlocked and protection locked security states of the level 1 for such a processing entity as performs processing including the rewriting of the nonvolatile memory device 414 as part of the system debug, it is possible to provide an easy-to-use debug environment.

While the invention made above by the present inventors has been described specifically based on the illustrated embodiments, the present invention is not limited thereto. It is needless to say that various changes and modifications can be made thereto without departing from the spirit and scope of the invention.

For example, the electrically erasable programmable nonvolatile memory, the debug interface, and the communication interface are not limited to those described above, and can be changed as appropriate. Further, the semiconductor device is not limited to the microcomputer, and can be widely applied to accelerators such as image processing, compression/expansion processing, and communication processing and other semiconductor devices of the system-on-chip type. Further, the authentication using secret information is not limited to the determination by a comparison match to secret information, but may be performed using any other authentication algorithm.

What is claimed is:

1. A semiconductor device comprising:
   an electrically erasable programmable nonvolatile memory device;
   a central processing unit for executing an instruction;
   an external interface circuit; and
   an external bus circuit,
   the nonvolatile memory device, the central processing unit, the external interface circuit, and the external bus circuit being coupled to an internal bus,
   the semiconductor device having, as security states to which the nonvolatile memory device can transition:
   a first security state in which, when secret information is not set in the nonvolatile memory device, reading from the nonvolatile memory device is permitted, rewriting the nonvolatile memory device is permitted, and external output from the external interface circuit is permitted;
   a second security state in which, when the secret information is set in the nonvolatile memory device, reading from the nonvolatile memory device is permitted, rewriting the nonvolatile memory device is permitted on condition that a result of authentication using the secret information is correct, and external output from the external interface circuit is permitted; and
   a third security state in which, when the secret information is set in the nonvolatile memory device, rewriting the nonvolatile memory device is inhibited until correctness as a result of authentication using the secret information is confirmed, reading from the nonvolatile memory device is inhibited under a predetermined condition, and external output from the external interface circuit is permitted, the predetermined condition including detection of a fraudulent instruction being executed by the central processing unit.

2. The semiconductor device according to claim 1, wherein the nonvolatile memory device has a nonvolatile memory unit having an array of nonvolatile memory cells and a memory control unit for controlling erase, write, and read operation procedures for a memory cell of the nonvolatile memory unit, and the memory control unit further controls the first to third security states.

3. The semiconductor device according to claim 2, wherein in a reset operation of the semiconductor device instructed in the second security state or the third security state, the memory control unit causes an initial security state of the nonvolatile memory device to be the third security state.

4. The semiconductor device according to claim 2, wherein the memory control unit has a set command, a reset command, and an authentication command, as a command set for controlling the first to third security states, the set command is a command for writing the secret information inputted from the external interface circuit to a predetermined memory area in the nonvolatile memory unit, the reset command is a command for disabling information in the predetermined memory area, and the authentication command is a command for controlling transition of the security state by comparing the secret information stored in the predetermined memory area with information provided from the external interface circuit and determining authentication correctness by a comparison match and authentication incorrectness by a comparison mismatch.

5. The semiconductor device according to claim 4, wherein the memory control unit causes the security state to transition to the first security state by execution of the reset command in the second security state or by a reset operation of the semiconductor device in a state in which the information in the predetermined memory area is disabled, causes the security state to transition to the second security state by execution of the set command in the first security state or by authentication correctness as an authentication result of executing the authentication command in the third security state, and causes the security state to transition to the third security state by authentication incorrectness as an authentication result of executing the authentication command in the second security state or by a reset operation of the semiconductor device in a state in which the secret information is set in the predetermined memory area.

6. The semiconductor device according to claim 4, further comprising a control mode register having a security control mode bit, wherein setting the security control mode bit to a first value enables execution of the set command, the reset command, and the authentication command, and setting the security control mode bit to a second value disables change of the security state by execution of the set command, the reset command, and the authentication command.

7. The semiconductor device according to claim 6, further comprising a security control status register indicating the current security state in the security control mode.

8. The semiconductor device according to claim 1, wherein read inhibit under the predetermined condition refers to that after detection of an instruction fetch in external address space via the external bus circuit by the central processing unit, and external output inhibit in the third security state is performed by outputting, from the nonvolatile memory device which responds to a read request, a predetermined value independent of reading from the memory or a random value different from output data of the nonvolatile memory device.

9. The semiconductor device according to claim 1, wherein the memory control unit disables a request for read access to an area for storing the secret information provided via the internal bus.

10. The semiconductor device according to claim 1, wherein detection of a fraudulent instruction being executed by the central processing unit includes detection of an instruction fetch in external address space.

11. A semiconductor device comprising:
an electrically erasable programmable nonvolatile memory device;
a central processing unit for executing an instruction;
a first external interface circuit which is assigned as a debug-specific external interface;
a second external interface circuit which is assigned as another external interface; and
an external bus circuit,
the nonvolatile memory device, the central processing unit, the first external interface circuit, the second external interface circuit, and the external bus circuit being coupled to an internal bus,
the semiconductor device having, as security states to which the nonvolatile memory device can transition:
a first security state in which, when first secret information and second secret information are not set in the nonvolatile memory device, reading from the nonvolatile memory device is permitted, rewriting the nonvolatile memory device is permitted, and external output from the first external interface circuit and the second external interface circuit is permitted;
a second security state in which, when the first secret information is set in the nonvolatile memory device, reading from the nonvolatile memory device is permitted, rewriting the nonvolatile memory device is permitted on condition that a result of authentication using the secret information is correct, and external output from the first external interface circuit and the second external interface circuit is permitted;
a third security state in which, when the first secret information is set in the nonvolatile memory device, rewriting the nonvolatile memory device is inhibited until correctness as a result of authentication using the secret information is confirmed, reading from the nonvolatile memory device is inhibited under a predetermined condition, and external output from the first external interface circuit and the second external interface circuit is permitted;
a fourth security state in which, when the second secret information is set in the nonvolatile memory device, reading from the nonvolatile memory device is permitted, rewriting the nonvolatile memory device is permitted on condition that a result of authentication using the secret information is correct, and external output from the first external interface circuit and the second external interface circuit is permitted; and
a fifth security state in which, when the second secret information is set in the nonvolatile memory device, rewriting the nonvolatile memory device is inhibited until correctness as a result of authentication using the secret information is confirmed, reading from the nonvolatile memory device is inhibited under the predetermined condition, an interface operation of the first external interface circuit is disabled, and external output from the second external interface circuit is permitted.

12. The semiconductor device according to claim 11, wherein the nonvolatile memory device has a nonvolatile memory unit having an array of nonvolatile memory cells and a memory control unit for controlling erase, write, and read operation procedures for a memory cell of the nonvolatile memory unit, and the memory control unit further controls the first to fifth security states.

13. The semiconductor device according to claim 12, wherein in a reset operation of the semiconductor device instructed in the second security state or the third security state, the memory control unit causes an initial security state of the nonvolatile memory device to be the third security state, and in a reset operation of the semiconductor device instructed in the fourth security state or the fifth security state, the memory control unit causes an initial security state of the nonvolatile memory device to be the fifth security state.

14. The semiconductor device according to claim 12, wherein the nonvolatile memory unit has a first memory area assigned to store the first secret information and a second memory area assigned to store the second secret information individually.

15. The semiconductor device according to claim 14, wherein the memory control unit has a set command, a reset command, and an authentication command, as a command set for controlling the first to fifth security states, the set command is a command for writing information inputted from the first external interface circuit or the second external interface circuit to the first memory area or the second memory area by specifying the first memory area or the second memory area, the reset command is a command for disabling the information in the first memory area and the second memory area, and the authentication command is a command for controlling transition of the security state by comparing the information inputted by specifying the first memory area or the second memory area with information in the specified first or second memory area and determining authentication correctness of the secret information in the specified memory area by a comparison match as to the information in the specified memory area and authentication incorrectness by a comparison mismatch as to the information in the specified memory area.

16. The semiconductor device according to claim 15, wherein the memory control unit causes the security state to transition to the first security state by execution of the reset command in the second security state, by execution of the reset command in the fourth security state, or by a reset operation of the semiconductor device in a state in which the information in the first memory area and the second memory area is disabled, causes the security state to transition to the second security state by execution of the set command specifying the first memory area in the first security state or by authentication correctness as an authentication result of executing the authentication command specifying the first memory area in the third security state, causes the security state to transition to the third security state by authentication incorrectness as an authentication result of executing the authentication command specifying the first memory area in the second security state or by a reset operation of the semiconductor device in a state in which the secret information is set in the first memory, causes the security state to transition to the fourth security state by execution of the set command specifying the second memory area in the first security state, by authentication correctness as an authentication result of executing the authentication command specifying the second memory area in the fifth security state, or by execution of the set command specifying the second memory area in the second security state, and causes the security state to transition to the fifth security state by authentication incorrectness as an authentication result of executing the authentication command specifying the second memory area in the fourth security state or by a reset operation of the semiconductor device in a state in which the secret information is set in the second memory.

17. The semiconductor device according to claim 15, further comprising a control mode register having a security control mode bit, wherein setting the security control mode bit to a first value enables execution of the set command, the reset command, and the authentication command, and setting the security control mode bit to a second value disables change of the security state by execution of the set command, the reset command, and the authentication command.

18. The semiconductor device according to claim 17, further comprising a security control status register indicating the current security state in the security control mode.

19. The semiconductor device according to claim 11, wherein read inhibit under the predetermined condition refers to that after detection of an instruction fetch in external address space via the external bus circuit by the central processing unit, and external output inhibit in the third security state and the fifth security state is performed by outputting, from the nonvolatile memory device which responds to a read request, a predetermined value independent of reading from the memory or a random value different from output data of the nonvolatile memory device.

20. The semiconductor device according to claim 11, wherein the memory control unit disables a request for read access to an area for storing the secret information provided via the internal bus.

21. A semiconductor device comprising:
an electrically erasable programmable nonvolatile memory device;
a central processing unit for executing an instruction;
an external interface circuit; and
an external bus circuit,
the nonvolatile memory device, the central processing unit, the external interface circuit, and the external bus circuit being coupled to an internal bus,
the semiconductor device having, as security states to which the nonvolatile memory device can transition:
a first security state in which, when secret information is not set in the nonvolatile memory device, reading from the nonvolatile memory device is permitted, rewriting the nonvolatile memory device is permitted, and external output from the external interface circuit is permitted;
a second security state in which, when the secret information is set in the nonvolatile memory device, reading from the nonvolatile memory device is permitted, rewriting the nonvolatile memory device is permitted on condition that a result of authentication using the secret information is correct, and external output from the external interface circuit is permitted; and
a third security state in which, when the secret information is set in the nonvolatile memory device, rewriting the nonvolatile memory device is inhibited until correctness as a result of authentication using the secret information is confirmed, reading from the nonvolatile memory device is inhibited under a predetermined condition, and external output from the external interface circuit is permitted,
wherein the nonvolatile memory device has a nonvolatile memory unit having an array of nonvolatile memory cells and a memory control unit for controlling erase, write, and read operation procedures for a memory cell of the nonvolatile memory unit, and the memory control unit further controls the first to third security states, and
wherein the memory control unit has a set command, a reset command, and an authentication command, as a command set for controlling the first to third security states, the set command is a command for writing the secret information inputted from the external interface circuit to a predetermined memory area in the nonvolatile memory unit, the reset command is a command for disabling information in the predetermined memory area, and the authentication command is a command for controlling transition of the security state by comparing the secret information stored in the predetermined memory area with information provided from the external interface circuit and determining authentication correctness by a comparison match and authentication incorrectness by a comparison mismatch.

22. The semiconductor device according to claim 21, wherein the memory control unit causes the security state to transition to the first security state by execution of the reset command in the second security state or by a reset operation of the semiconductor device in a state in which the information in the predetermined memory area is disabled, causes the security state to transition to the second security state by execution of the set command in the first security state or by authentication correctness as an authentication result of executing the authentication command in the third security state, and causes the security state to transition to the third security state by authentication incorrectness as an authentication result of executing the authentication command in the second security state or by a reset operation of the semiconductor device in a state in which the secret information is set in the predetermined memory area.

23. The semiconductor device according to claim 21, further comprising a control mode register having a security control mode bit, wherein setting the security control mode bit to a first value enables execution of the set command, the reset command, and the authentication command, and setting the security control mode bit to a second value disables change of the security state by execution of the set command, the reset command, and the authentication command.

24. The semiconductor device according to claim 23, further comprising a security control status register indicating the current security state in the security control mode.

* * * * *